(12) United States Patent
Garrone et al.

(10) Patent No.: US 9,222,213 B2
(45) Date of Patent: Dec. 29, 2015

(54) MACHINE FOR SPREADING OUT AND LOADING FLAT CLOTHING ARTICLES

(71) Applicants: Dominique Garrone, Aix les Bains (FR); Sylvain Duplouy, Brison-Saint-Innocent (FR); Manuel Gorriz, La Biolle (FR)

(72) Inventors: Dominique Garrone, Aix les Bains (FR); Sylvain Duplouy, Brison-Saint-Innocent (FR); Manuel Gorriz, La Biolle (FR)

(73) Assignee: GIRBAU ROBOTICS (FR)

( * ) Notice: Subject to any disclaimer, the term of this patent is extended or adjusted under 35 U.S.C. 154(b) by 75 days.

(21) Appl. No.: 14/251,643

(22) Filed: Apr. 13, 2014

(65) Prior Publication Data

US 2015/0284899 A1 Oct. 8, 2015

Related U.S. Application Data

(63) Continuation-in-part of application No. PCT/IB2012/002071, filed on Oct. 16, 2012.

(30) Foreign Application Priority Data

| Oct. 17, 2011 | (EP) | ................................. 11380080 |
| Oct. 17, 2011 | (EP) | ................................. 11380081 |
| Nov. 25, 2011 | (EP) | ................................. 11380096 |

(51) Int. Cl.
*D06F 67/04* (2006.01)
*D06F 71/38* (2006.01)
*D06C 3/00* (2006.01)
*B65G 47/04* (2006.01)

(52) U.S. Cl.
CPC ................ *D06F 67/04* (2013.01); *B65G 47/04* (2013.01); *D06C 3/00* (2013.01); *D06F 71/38* (2013.01)

(58) Field of Classification Search
CPC ......... D06F 67/00; D06F 67/04; D06F 71/38; D06C 3/00; B65H 7/00; B65H 7/02; B65G 47/04
USPC ............................................................ 38/143
See application file for complete search history.

(56) References Cited

U.S. PATENT DOCUMENTS

| 1,606,202 A | * | 11/1926 | Yanchenko | ...................... 74/614 |
| 2,108,230 A | * | 2/1938 | Molinare | ........................... 38/60 |
| 2,989,305 A | * | 6/1961 | Smith | ............................. 493/419 |
| 3,228,127 A | * | 1/1966 | Roiland | ........................... 38/143 |

(Continued)

FOREIGN PATENT DOCUMENTS

| EP | 0345 087 A1 | 12/1989 |
| EP | 0 523 872 A1 | 1/1993 |

(Continued)

*Primary Examiner* — Ismael Izaguirre
(74) *Attorney, Agent, or Firm* — Hess Patent Law Firm LLC; Robert J. Hess

(57) ABSTRACT

The machine comprises a conveyor belt (30) and loading clamps (24*a*) which receive contiguous corners (A1) of a flat clothing article (A) manually loaded by an operator (P) in a loading station (1) and transfer them to spreading clamps (4*a*). Each loading clamp (24*a*) has a loading jaw (51) driven by an actuator (52) and an auxiliary loading jaw (53) with yielding and recovery capacity to catch parts of the corner (A1) against opposite sides of a loading support (50), and an air blowing nozzle (55) producing an airflow capable of pushing a portion of corner (A1) released from the auxiliary loading jaw (53) and introducing it between jaws of a corresponding spreading clamp (4*a*) driven by an actuator (58) for catching the portion of corner (A1) previously released.

22 Claims, 12 Drawing Sheets

(56) References Cited

U.S. PATENT DOCUMENTS

| | | | |
|---|---|---|---|
| 3,425,142 A * | 2/1969 | Juraschek et al. | 38/22 |
| 3,553,861 A * | 1/1971 | Orkney et al. | 38/2 |
| 3,736,678 A * | 6/1973 | Kamberg | 38/143 |
| 5,172,502 A * | 12/1992 | Kober | 38/7 |
| 5,349,768 A * | 9/1994 | Ishihara et al. | 38/143 |
| 5,515,627 A * | 5/1996 | McCabe | 38/143 |

FOREIGN PATENT DOCUMENTS

| | | |
|---|---|---|
| FR | 2 810 347 A1 | 12/2001 |
| GB | 760103 A * | 10/1956 |
| WO | WO 2013/057562 A3 | 4/2013 |

* cited by examiner

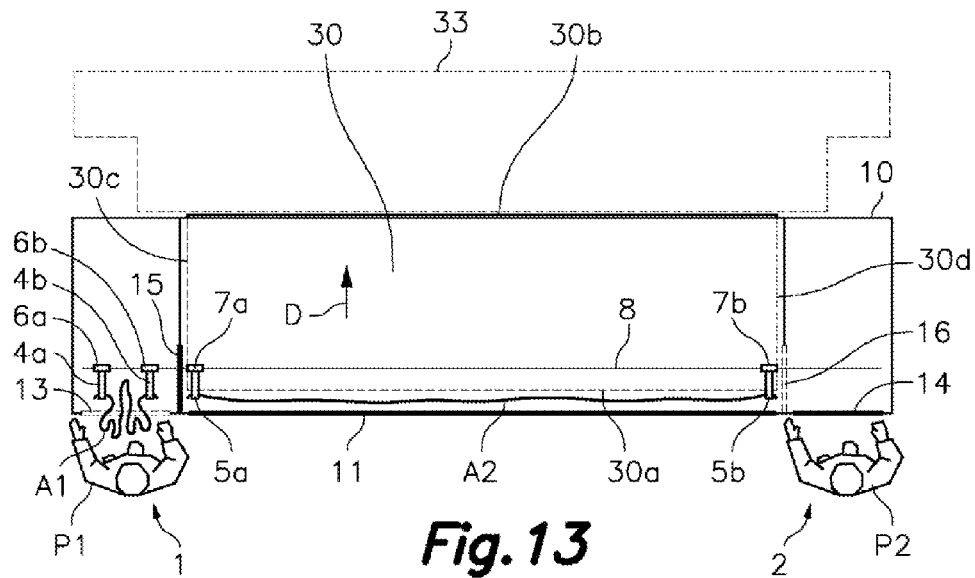
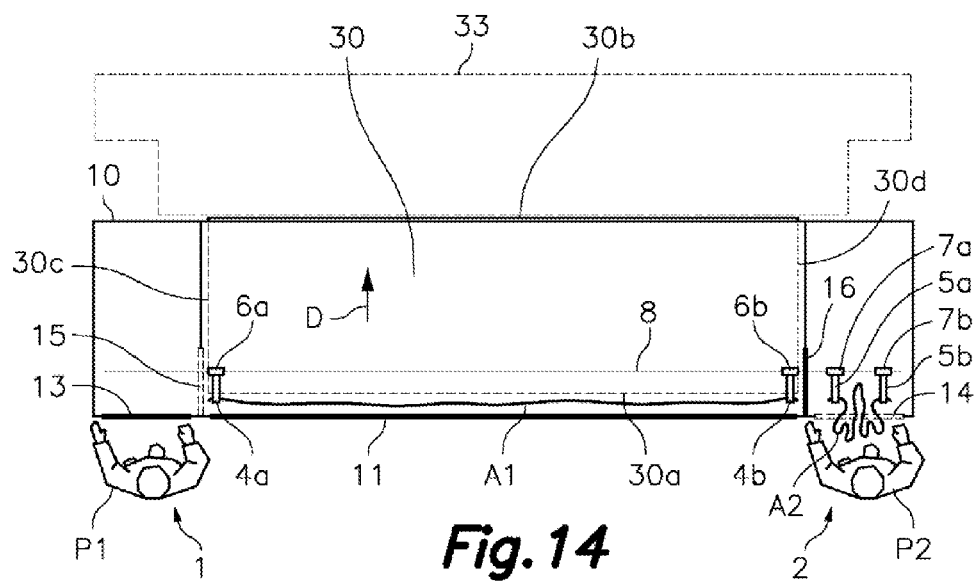

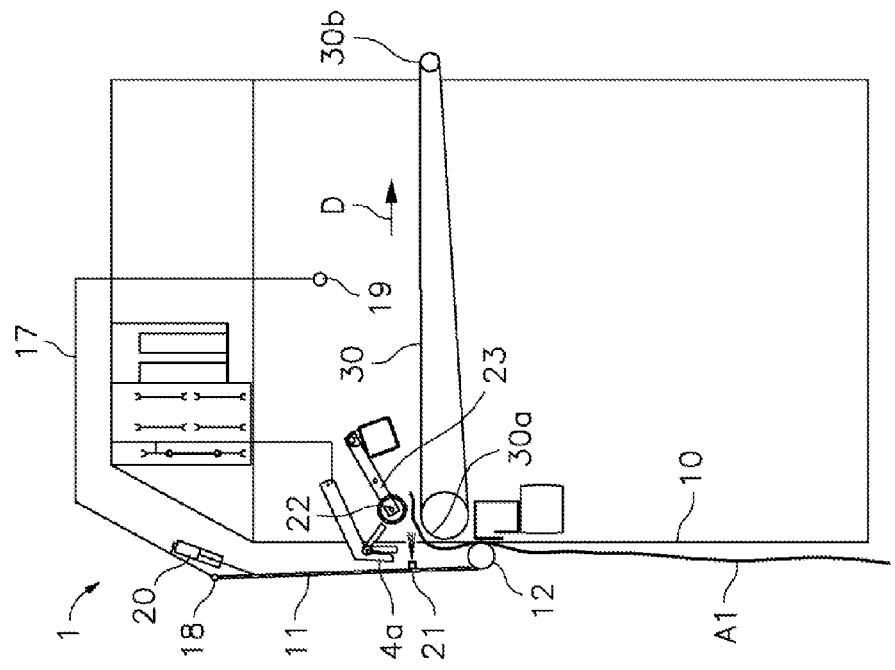
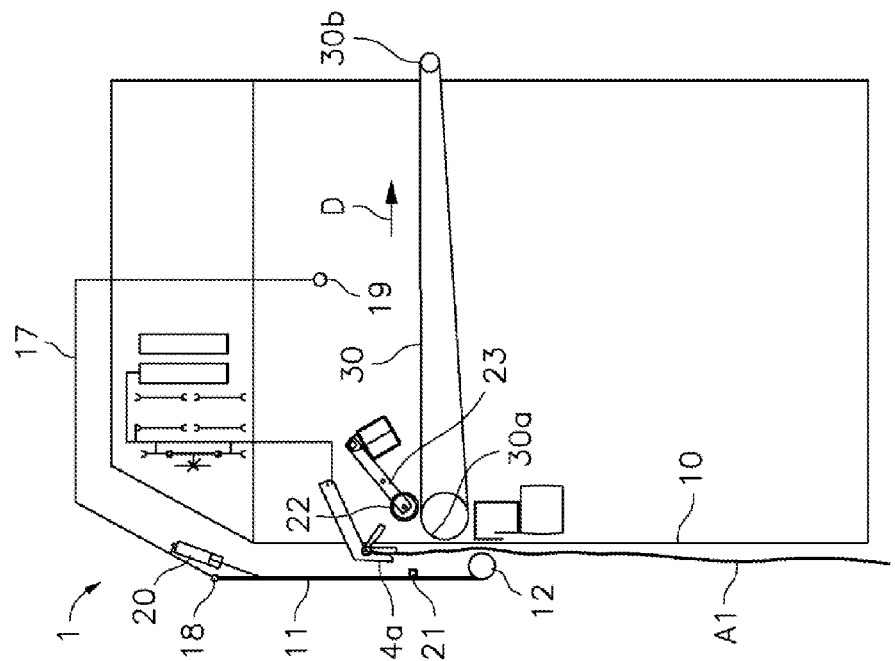

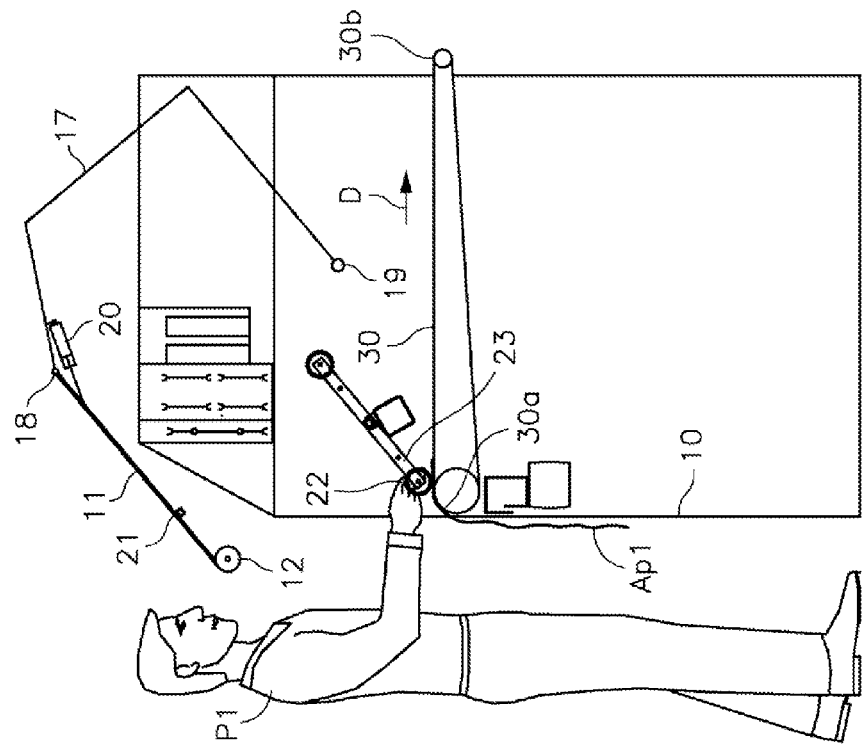
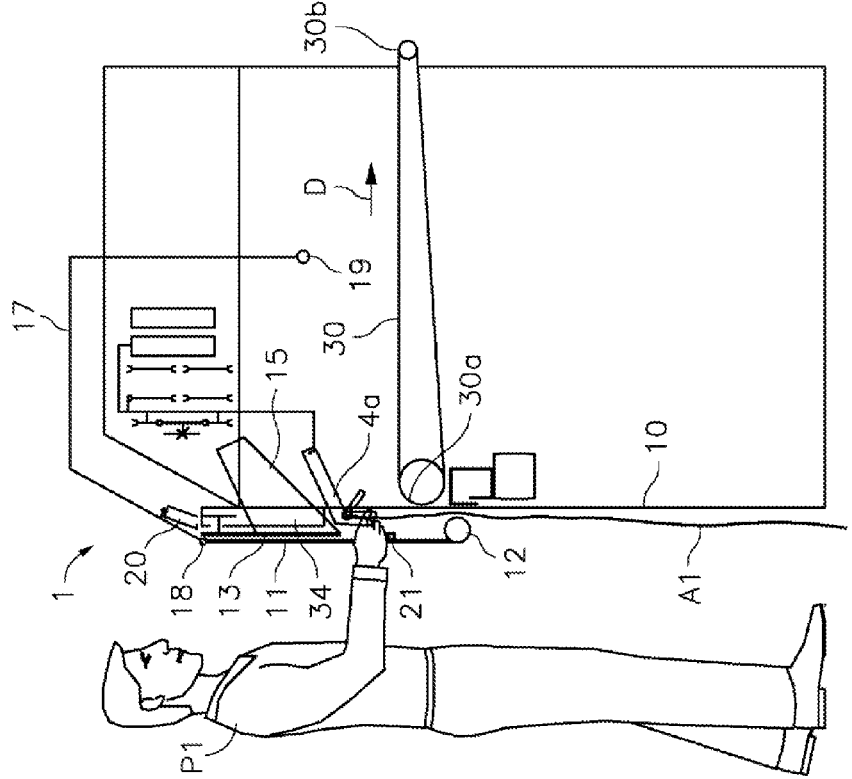
Fig.17
Fig.18

MACHINE FOR SPREADING OUT AND LOADING FLAT CLOTHING ARTICLES

TECHNICAL FIELD

The present invention relates to a machine for spreading out and loading flat clothing articles such as sheets or tablecloths, useful for loading such articles to a laundry processing unit, such as an ironing machine, dryer or the like.

BACKGROUND OF THE INVENTION

Machines for spreading out and loading flat clothing articles comprising a frame supporting a conveyor belt and several loading stations served by respective operators in a semiautomatic loading mode are known in the prior art. Each loading station comprises a pair of loading clamps in which the corresponding operator secures two contiguous corners of a large flat clothing article, for example a sheet or a tablecloth. These loading clamps are moved from a loading position where the large flat clothing article has been loaded to a transferring position in which the loading clamps transfer the contiguous corners of the flat clothing article to spreading clamps. The spreading clamps are then moved in a direction transverse to the forward direction of the conveyor belt such that they unfold the flat clothing article, position it facing a loading end of the conveyor belt and smoothen it. Deposition means then deposit an upper end of the flat clothing article on the conveyor belt and the movement of the conveyor belt loads the flat clothing article thereon and transfers it to the laundry processing unit.

In another type of prior art machines, each loading station comprises a pair of loading and spreading clamps in which the corresponding operator secures two contiguous corners of the large flat clothing article. These loading and spreading clamps carrying the flat clothing article are then moved in a direction transverse to the forward direction of the conveyor belt such that they unfold the flat clothing article, position it facing a loading end of the conveyor belt and smoothen it. Then, the deposition means deposit the flat clothing article on the conveyor as mentioned above.

Some of these prior art machines further include an alternative manual loading mode by means of which one or more operators can load small flat clothing articles such as napkins, pillowcases, cloths or tablecloths directly on the conveyor belt.

In some of these prior art machines, each of the loading clamps comprises a fixed loading support and a loading jaw driven by an actuator to catch and maintain a part of one of the corners of the flat clothing article against one side of said loading support. One drawback of clamps of this type is the fact that the contiguous corners of the flat clothing article are transferred from the loading clamps to the spreading clamps in conditions which do not assure a correct attachment of the corners in the spreading clamps, and this causes folds and wrinkles in the flat clothing article when the same is subsequently deposited on the conveyor belt by the deposition means.

Document EP-A-1683908 describes an example of one of such machines of the prior art. Other known machines are described in EP-A-0554205 and JP-A-2002326000.

These machines for spreading and loading flat clothing articles of the state of the art have in general one or more of the following drawbacks:

Risk for the operators due to the movements of the clamps which are necessarily fast if wanting to achieve a high productivity.

Productivity relatively limited by the time taken by the conveyor belt to load a flat clothing article, since the spreading clamps cannot spread and position a flat clothing article until the loading end of the conveyor belt is free to receive it and to not hinder the preceding flat clothing article.

Bad quality in depositing the flat clothing articles on the conveyor belt, for example the presence of folds and wrinkles due to the bad conditions in which the deposition is performed in machines of high productivity.

Large sizes of the machine, for example in those cases in which the transferring means are located at a height sufficient to keep certain movable elements away from the operators and thus reducing their risk.

Poor visibility of the small flat clothing articles deposited on the conveyor belt in the manual loading mode due to the concealment caused by protection elements partially removed for accessing the conveyor belt.

DISCLOSURE OF THE INVENTION

The present invention contributes to solve the foregoing and other drawbacks by providing a machine for spreading out and loading flat clothing articles comprising at least one conveyor belt moving in a loading direction, at least one pair of spreading clamps independently driven for moving along a guide rail transverse to said loading direction of the conveyor belt, and a plurality of loading stations, each of which is provided with a pair of loading clamps adjacent to one another driven for moving between a loading position, in which said loading clamps are located and arranged to catch respective contiguous corners of a flat clothing article manually loaded by an operator in said loading station, and a delivery position, in which the loading clamps transfer said corners of said flat clothing article to said pair of spreading clamps which are then moved along said guide rail for spreading out the flat clothing article in front of a loading end of the conveyor belt.

Each of the loading clamps comprises a loading support and a loading jaw driven by a first actuator to catch and maintain a proximal portion of one of the corners of the flat clothing article against one side of said loading support and an auxiliary loading jaw with yielding and recovery capacity to catch and maintain a distal portion of the corner of the flat clothing article against an opposite second side of said loading support. The loading support is associated to an air blowing nozzle arranged for blowing an airflow against the flat clothing article between said loading jaw and said auxiliary loading jaw.

Each of the spreading clamps comprises a pair of jaws, at least one of which is driven for moving between an open position and a closed position. Said distal portion of the corner, when it is released from said auxiliary loading jaw is pushed by said airflow and introduced between said pair of jaws of the spreading clamp so that it can be caught by the spreading clamp before the loading jaw opens.

This construction assures a reliable transfer of the contiguous corners of the flat clothing article from the loading clamps to the spreading clamps in conditions which prevent the formation of folds and wrinkles in the flat clothing article when it is subsequently spread out and positioned by the spreading clamps and deposited on the conveyor belt by the deposition means.

In an embodiment, the loading support is in the form of a substantially vertical bar having an upper end fixed to a frame and a free lower end, and the loading jaw and the auxiliary loading jaw are adjacent to an upper portion of the loading support.

In an embodiment, said auxiliary loading jaw is pushed by an elastic element to press against said opposite second side of the loading support, and the spreading clamp includes a releasing stop positioned for interfering said auxiliary loading jaw and make it yield when the loading clamp moves towards the spreading clamp and thereby releasing the distal portion from the corner of the flat clothing article. The distal end of the corner of the flat clothing article is caught by deforming said elastic element when the operator arranges the corner of the flat clothing article partially surrounding a lower portion of the loading support and manually slides it to said upper portion. A control system includes an article detector, such as for example a photoelectric cell, positioned such that it detects the presence of the flat clothing article when the latter reaches the upper portion of the loading support and controlling means activating the first actuator and thereby moving the loading jaw to a closed position to catch the proximal portion of the corner of the flat clothing article between the loading jaw and the loading support.

In another embodiment, said auxiliary loading jaw is suspended such that it can freely swing and is pushed by gravity to press against said opposite second side of the loading support. The distal end of the corner of the flat clothing article is caught and retained by the effect of the weight of the auxiliary loading jaw when the operator arranges the corner of the flat clothing article partially surrounding a lower portion of the loading support and manually slides it to said upper portion. The airflow produced by said blowing nozzle is strong enough for making the auxiliary loading jaw yield and thereby releasing the distal portion of the corner of the flat clothing article.

In an embodiment, the loading support has an inner duct connected to a pressurized air supply source and said air blowing nozzle is in the form of a lateral opening formed in the loading support in communication with said inner duct.

In an embodiment, in each loading station there is an access protection screen driven by driving means for moving between an open position, in which the access protection screen allows the access of the operator to the loading clamps, and a closed position, in which the access protection screen prevents the access of the operator to the loading clamps, and an intermediate protection screen driven by driving means for moving between an open position, in which the intermediate protection screen allows the movement of the loading clamps between their loading and delivery positions, and a closed position, in which the intermediate protection screen prevents the access of the operator to the spreading clamps when the access protection screen is in its open position.

In an embodiment, the movements of the loading clamps between their loading positions and their delivery positions are driven by driving means controlled by controlling means configured for stopping said driving means in the event that the loading clamps encounter a resistance above a predetermined threshold during their movements between the loading positions and the delivery positions. This eliminates or minimizes the risk of injury for the operator in the event that he/she puts his/her hands between the loading clamps and the spreading clamps. With this control system for controlling the movements of the loading clamps, the function of the access protection screens may be unnecessary, thereby they can be omitted.

Optionally, the conveyor belt has a loading end frontally covered by a protective cover, and the machine comprises first and second loading stations located adjacent to first and second side ends of the protective cover, respectively. One pair of first spreading clamps and one pair of second spreading clamps are movable along a guide rail transverse to said loading direction of the conveyor belt.

Driving means independently move the two clamps of the pair of first spreading clamps along the guide rail between a receiving position, in which the first spreading clamps are adjacent to one another in said first loading station and arranged for catching respective contiguous corners of a first flat clothing article manually loaded by a first operator, and a spread out position, in which the first spreading clamps are separated from one another holding said first flat clothing article hanging by gravity and spread out with respect to said loading end of the conveyor belt with its upper edge taut. Similarly, the driving means independently move the two clamps of the pair of second spreading clamps along the guide rail between a receiving position, in which said second spreading clamps are adjacent to one another in said second loading station for catching respective contiguous corners of a second flat clothing article manually loaded by a second operator, and a spread out position, in which the second spreading clamps are separated from one another holding said second flat clothing article hanging by gravity and spread out with respect to said loading end of the conveyor belt with its upper edge taut.

The machine further comprises deposition means for depositing an upper end of said first and second flat clothing articles on the conveyor belt from the position in which they are supported by the first or second pair of spreading clamps when they are in the mentioned spread out position.

The mentioned protective cover is movable and has a pressing edge at a lower end. The driving means move the protective cover between a free passage position, in which said pressing edge is at a distance from the frame sufficient to allow the passage of the first and second flat clothing articles held and moved by the first or second spreading clamps between their receiving and spread out positions, and a retaining position, in which the pressing edge is applied against the frame catching therebetween the first or second flat clothing article spread out and held by the first or second spreading clamps in the spread out position. When the spreading clamps release the corners of the first or second flat clothing article, the latter is supported between the pressing edge of the protective cover and the frame while said deposition means act.

Throughout this description, the term "first flat clothing article" is used to designate any flat clothing article loaded by the first operator in the first loading station and the term "second flat clothing article" is used to designate any flat clothing article loaded by the second operator in the second loading station.

The deposition means comprise, in an embodiment, at least one blowing nozzle fixed to the protective cover and arranged for blowing an airflow on an upper part of the flat clothing article which is being supported by the pressing edge of the protective cover once the pair of first or second spreading clamps have released the contiguous corners of the flat clothing article for depositing the upper part of the flat clothing article on the loading end of the conveyor belt. Additionally, the flat clothing article is pressed against the upper surface of the conveyor belt by press wheels installed at the ends of press arms or is attracted by suction against the upper surface of the conveyor belt by means of a suction chamber through openings existing in the conveyor belt.

The movable protective cover provided with the mentioned pressing edge acts as a safety element against risks for the operators and furthermore, in cooperation with the deposition means, assures that the flat clothing articles are deposited in a regular and reliable manner on the conveyor belt, without folds or wrinkles.

In an embodiment, the machine comprises a separator element moved by driving means between a separating position and a retracted position in coordination with the movements of the protective cover between their free passage position and retaining position, respectively. In the separating position, a separating edge of said separator element is at a distance from the protective cover sufficient to allow the passage of the first and second flat clothing articles held and moved by the first or second spreading clamps between their receiving and spread out positions when the protective cover is in the free passage position, at the same time that said separating edge of the separator element keeps the first or second flat clothing article sufficiently separated from the loading end of the conveyor belt to not interfere with a first or second flat clothing article previously deposited and which is being moved by the conveyor belt. In the retracted position which corresponds to the retaining position of the protective cover, the separator element is not in contact with the first or second flat clothing article and leaves the loading end of the conveyor belt free to allow the upper part of the first or second flat clothing article caught between the pressing edge of the protective cover and the frame to be deposited on the conveyor belt by the deposition means.

This separator element contributes to increase the productivity of the machine since it allows spreading and positioning a flat clothing article with respect to the loading end of the conveyor belt by the spreading clamps while another preceding flat clothing article, which is still being transported by the conveyor belt, is partially arranged on the conveyor belt and with one part thereof hanging by gravity from the loading end.

Another safety element against risks for the operators in an embodiment of the machine of the present invention consists of safety screens preventing the operators from being able to be harmed by the spreading clamps while the same are moved at high speed between their receiving and spread out positions. Thus, the first and second loading stations comprise respective first and second access protection screens moved by driving means between an open position and a closed position. In the open position, the first and second access protection screens allow the access of the first or second operator to the corresponding pair of first or second spreading clamps when the same is in the receiving position, and in the closed position the first and second access protection screens prevent the access of the first or second operator to the corresponding pair of first or second spreading clamps.

The first and second loading stations further comprise respective first and second inner protection screens moved by driving means between an open position and a closed position. In the open position, said first and second inner protection screens allow the movements of the corresponding pair of first or second spreading clamps between their receiving and spread out positions, and in the closed position the first and second inner protection screens prevent the access of the first or second operator to the corresponding pair of first or second spreading clamps when the same are not in the first or second loading station.

The driving means of the first and second access protection screens and of the first and second inner protection screens are controlled by control means such that when one of the loading stations has its access protection screen in its open position, then the inner protection screen of the same loading station is in its closed position, whereas the access protection screen of the other loading station is in its closed position, and the corresponding inner protection screen is in its open position, and vice versa.

In an embodiment, the machine comprises a third loading station configured to be used by a third operator. This third loading station is located between the first and second loading stations facing the conveyor belt and in communication with an opening formed in the protective cover. In this case, the first, second and third loading stations include respective pairs of first, second and third loading clamps moved by driving means in a direction parallel to the loading direction between a loading position and a transferring position. In the loading position, the pairs of first, second and third loading clamps are in a position suitable for receiving contiguous corners of the first, second and third flat clothing articles manually loaded by the first, second and third operators. In the transferring position, the pairs of first, second and third loading clamps are adjacent to one of the first and second pairs of spreading clamps and transfer said contiguous corners of the first, second and third flat clothing articles to the pairs of first and second spreading clamps.

Throughout this description, the term "third flat clothing article" is used to designate any flat clothing article loaded by the third operator in the third loading station.

In this embodiment of the machine with three loading stations, the aforementioned first and second access protection screens of the first and second loading stations, when they are in their closed positions, prevent the access of the first or second operator to the respective first and second pairs of loading clamps when the same are in the loading position, and the third loading station comprises a third access protection screen moved by driving means between an open position and a closed position. In the open position, said third access protection screen allows the access of the third operator to the corresponding pair of third loading clamps when the same is in the loading position, and in the closed position the third access protection screen prevents the access of the third operator to the corresponding pair of third loading clamps.

The three loading stations include respective first, second and third intermediate screens moved by driving means between a closed position and an open position. In the closed position, the first, second and third intermediate screens are interposed between the pairs of first, second and third loading clamps and the pairs of first and second spreading clamps when the latter are in the receiving position, such that they prevent the access of the corresponding first, second or third operator to the first and second pairs of spreading clamps when the corresponding first, second and third access protection screens are in their open position. In the open position, the first, second and third intermediate screens allow the movements of the pairs of first, second and third loading clamps between their loading and transferring positions.

In an embodiment, the movements of the loading clamps between their loading positions and their delivery positions are driven by driving means controlled by control means configured for stopping said driving means in the event that the loading clamps encounter a resistance above a predetermined threshold during their movements between the loading positions and the delivery positions. This eliminates or reduces to the minimum the risk of injury for the operator in the event that he/she puts his/her hands between the loading clamps and the spreading clamps. With this control system for controlling the movements of the loading clamps, the function of the access protection screens may be unnecessary, therefore the access protection screens can be omitted.

The first, second and third loading stations described above allow the machine of the present invention to function in a semiautomatic loading mode in which the corresponding operators manually load two contiguous corners of the flat clothing article to the clamps and the machine automatically performs the subsequent operations of spreading, positioning and depositing and transporting the flat clothing article. However, the machine of the present invention is prepared to function in a manual loading mode, in which one or more, generally up to three, operators can load small flat clothing articles directly on the loading end of the conveyor belt.

To that end, the protective cover is installed in a casing portion, which is in turn connected to the frame of the machine by a casing hinge. In the embodiment with two loading stations, the casing portion together with the protective cover can pivot with respect to the frame between a semiautomatic loading position and a manual loading position. In said semiautomatic loading position the protective cover frontally covers the loading end of the conveyor belt such that the large flat clothing articles can be loaded through the loading stations in the semiautomatic loading mode as has been described above. Contrarily, in said manual loading position the protective cover is lifted up and exposes the loading end of the conveyor belt such that it allows one or more operators to manually load small flat clothing articles directly on the loading end of the conveyor belt in the manual loading mode. In this manual loading position the protective cover is lifted up sufficiently to provide the operators with good visibility of the clothing articles deposited.

In the embodiment with three loading stations, the protective cover is also installed in the mentioned casing portion similarly to the embodiment with two loading stations, and the third loading station is directly connected to the casing portion. Thus, the casing portion pivots together with the protective cover and the third loading station between the semiautomatic loading position and the manual loading position. In the semiautomatic loading position, the protective cover and the third loading station are in an operative condition. In the manual loading position, the protective cover and the third loading station are in inoperative positions and are lifted up sufficiently to provide the operators with good visibility of the clothing articles deposited.

Both in the embodiment with two loading stations and in the embodiment with three loading stations, the protective cover is connected to the casing portion by a cover hinge, such that the protective cover can pivot about said cover hinge between the free passage position and retaining position. The driving means are operatively connected to the protective cover and to the casing portion to drive the movements of the protective cover between the free passage position and retaining position with respect to the casing portion, which is performed when the casing portion is in the semiautomatic loading position.

BRIEF DESCRIPTION OF THE DRAWINGS

The foregoing and other features and advantages will be better understood from the following detail description of exemplary embodiments with reference to the attached drawings, in which:

FIG. 13 is a schematic plan view of a machine for spreading out and loading flat clothing articles according to a second embodiment of the present invention with two loading stations in a semiautomatic loading mode and with protection screens in a first position;

FIG. 14 is a schematic plan view of the machine of FIG. 13 in the semiautomatic loading mode and with the protection screens in a second position;

FIG. 15 is a side view of the machine of FIG. 13 in the semiautomatic loading mode with a protective cover in a free passage position;

FIG. 16 is a side view of the machine of FIG. 13 in the semiautomatic loading mode with the protective cover in a retaining position;

FIG. 17 is a side view of the machine of FIG. 13 showing a first loading station in the semiautomatic loading mode;

FIG. 18 is a side view of the machine of FIG. 13 in a manual loading mode;

DETAILED DESCRIPTION OF EXEMPLARY EMBODIMENTS

Figure 1:
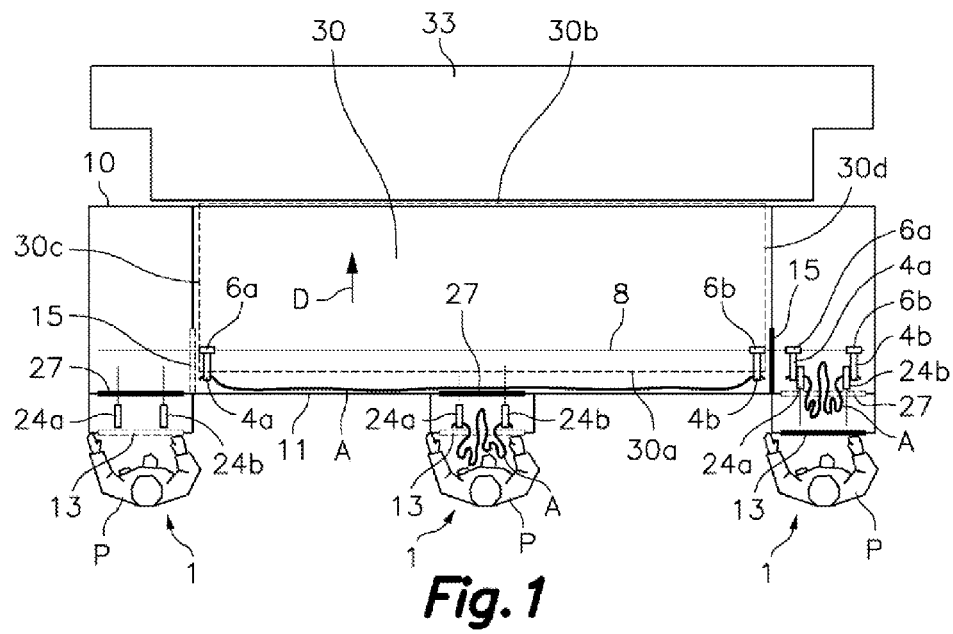
FIG. 1 is a schematic plan view of a machine for spreading out and loading flat clothing articles according to a first embodiment of the present invention.

Referring first to FIG. 1, there is shown a machine for spreading and loading flat clothing articles according to an embodiment of the present invention, which comprises a frame 10 supporting a conveyor belt 30 having a substantially horizontal or slightly inclined upper section moving in a loading direction D. The conveyor belt 30 has a loading end 30a on which there is deposited a duly spread out and positioned upper portion of flat clothing articles A, and an unloading end 30b from which the flat clothing articles A1, A2 spread out on the conveyor belt are transferred to a laundry processing unit 33, such as an ironing machine or a folding machine, schematically depicted by means of dashed lines in FIG. 1. Flat clothing articles is understood as table linen elements and other clothing for use in the home, hospitals, hotels, restaurants, etc., such as tablecloths, napkins, sheets and towels, among others.

The mentioned loading end 30a of the conveyor belt 30 is frontally covered by a protective cover 11, and the machine includes three loading stations 1, two of which are adjacent to lateral ends of said protective cover 11, beyond corresponding lateral ends 30c, 30d of the conveyor belt 30, and a third loading station 1 is located in a central position between the other two loading stations 1, and facing an opening of the protective cover 11. The three loading stations 1 are used by respective operators P.

All along the width of the conveyor belt 30 and of the two loading stations 1 located at the lateral ends thereof a guide rail 8 arranged in a direction transverse to said loading direction D of the conveyor belt 30 is extended. Two pairs of spreading clamps 4a, 4b are installed on corresponding carriages 6a, 6b which are independently moved by driving means along said guide rail 8 between a receiving position, in which said pairs of spreading clamps 4a, 4b are adjacent to one another in one of the loading stations 1 (loading station 1 to the right of FIG. 1), and a spreading out position, in which the spreading clamps 4a, 4b of the corresponding pair are separated from one another and positioned facing the loading end of the conveyor belt 30.

Each loading station 1 includes a pair of loading clamps 24a, 24b moved by driving means in a direction substantially perpendicular to the guide rail 8 between a loading position and a transferring position. In said loading position, the pair of loading clamps 24a, 24b is in a position adjacent to a window of the loading station 1 accessible by the operator P, such that the loading clamps 24a, 24b can receive contiguous corners of the flat clothing article A loaded manually by the corresponding operator P. In said transferring position, the pair of loading clamps 24a, 24b are adjacent to the spreading clamps 4a, 4b when the latter are in their receiving position and transfer the contiguous corners C1, C2 of the flat clothing article A to the pair of spreading clamps 4a, 4b.

Each loading station 1 comprises a movable access protection screen 13 and a movable intermediate protection screen 27. The access protection screens 13 are driven by driving means for moving between an open position (shown by means of dashed lines) and a closed position (shown by means of thick lines) to allow or prevent the access of the operators P to the loading clamps 24a, 24b, respectively. The intermediate protection screens 27 are driven by driving means for moving between an open position (shown by means of dashed lines) to allow the movements of the loading clamps 24a, 24b between their loading and spreading out positions, and a closed position (shown by means of thick lines) to prevent the access of the operator P to the spreading clamps 4a, 4b when the access protection screen 13 is in its open position.

The two end loading stations 1 further include respective movable inner protection screens 15 substantially perpendicular to the guide rail 8. Each inner protection screen 15 is driven by driving means for moving between an open position, in which the inner protection screen 15 allows the movements of the spreading clamps 4a, 4b between their receiving and spreading out positions, and a closed position, in which the inner protection screen 15 is interposed between the corresponding loading station 1 and the spreading clamps 4a, 4b when the same are not in the loading station 1.

The machine includes an additional safety element consisting of controlling means which control driving means driving the movements of the loading clamps 24a, 24b, between their loading positions and their delivery positions such that the controlling means stop said driving means in the event that the loading clamps 24a, 24b encounter a resistance above a predetermined threshold during their movements between the loading positions and the delivery positions, for example in the event that an operator P puts a hand between the loading clamps 24a, 24b and the spreading clamps 4a, 4b.

Figure 2:
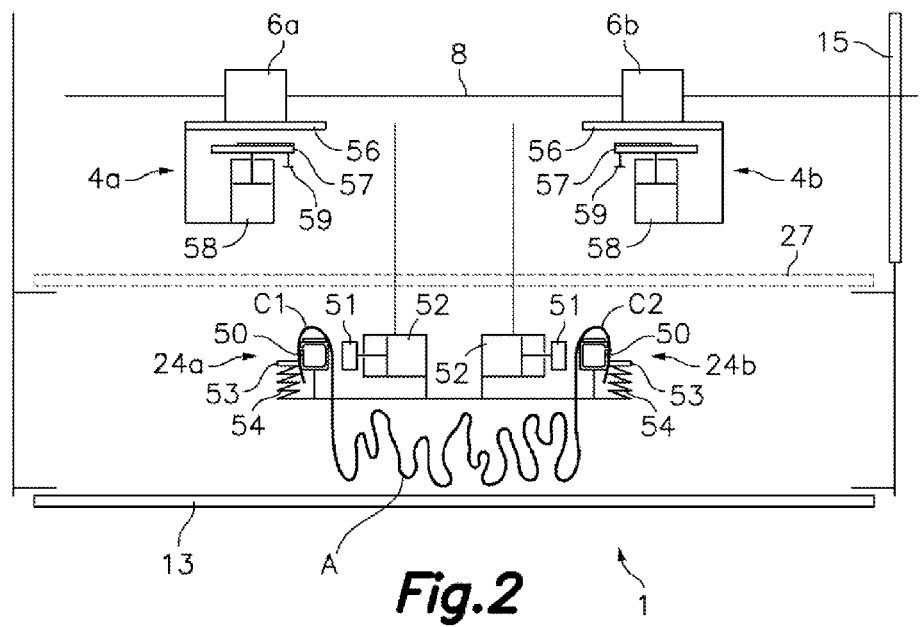
FIG. 2 is a schematic plan view of an enlarged detail showing a loading station of the machine for spreading out and loading flat clothing articles of FIG. 1.

FIG. 2 shows one of the loading stations 1 with its loading clamps 24a, 24b in the loading position securing the contiguous corners C1, C2 of a flat clothing article A manually loaded by an operator, and the spreading clamps 4a, 4b in the receiving position. FIG. 2 also shows the corresponding access protection screen 13 in the closed position, the corresponding intermediate protection screen 27 in the open position, and the corresponding inner protection screen 15 in the closed position.

Now in relation with FIGS. 3 to 8, they describe the construction of one of the loading clamps 24a and one of the spreading clamps 4a, as well as the operation of the same for transferring one of the corners C1 of the flat clothing article A from one to the other, with the understanding that the construction and the operation of the other loading clamps 24b and of the other spreading clamps 4b is symmetrical and completely similar.

Figure 3:
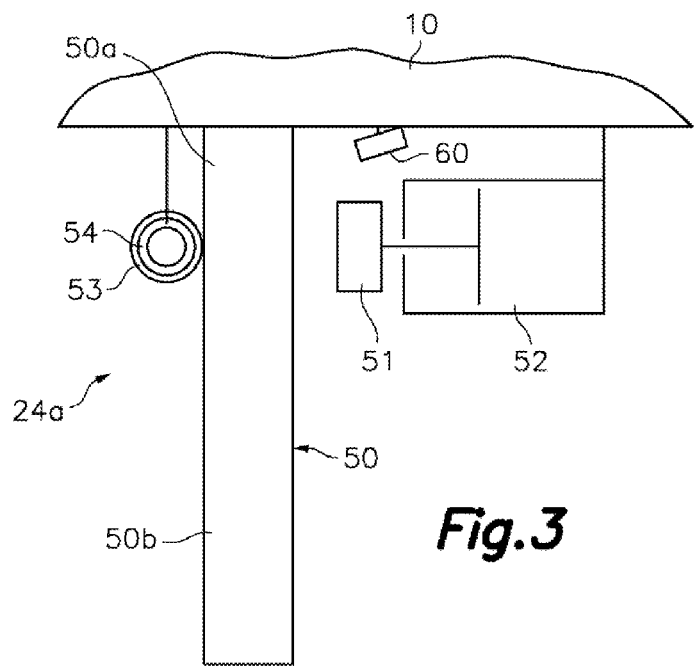
FIG. 3 is a schematic front view of a loading clamp of the loading station of FIG. 2.

As is better shown in FIG. 3, each of the loading clamps 24a comprises a loading support 50 in the form of a substantially vertical bar having an upper end fixed to a frame 10 of the machine and a free lower end. Adjacent to an upper portion 50a of the loading support 50 there are a loading jaw 51 and an auxiliary loading jaw 53. The loading jaw 51 is movable and is driven by a first actuator 52 to catch and maintain a proximal portion of one of the corners C1 of the flat clothing article A against one side of said loading support 50 (see also FIGS. 4 to 8) whereas the auxiliary loading jaw 53 is supported by an elastic element 54 such that the elastic element 54 pushes the auxiliary loading jaw 53 to catch and maintain a distal portion of the corner C1 of the flat clothing article A against an opposite second side of said loading support 50.

To secure the corner C1 of the flat clothing article A in the loading clamp 24a, the operator first arranges the corner C1 of the flat clothing article A partially surrounding a lower portion 50b of the loading support 50 and then slides the corner C1 manually to said upper portion 50a of the loading support 50. When the corner C1 of the flat clothing article A reaches said upper portion 50a of the loading support 50, the distal end of the corner C1 of the flat clothing article A is immediately caught by elastic deformation of said elastic element 54, whereas the first actuator 52 of the loading jaw 51 is activated by a control system comprising an article detector 60, such as photoelectric cell, provided for detecting the presence of the flat clothing article A in the upper portion 50a of the loading support 50 and controlling means activating the first actuator 52 when the flat clothing article A is detected by the article detector 60, and thereby moving the loading jaw 51 to a closed position catching the corner C1 of the flat clothing article A between the loading jaw 51 and the loading support 50.

The vertical bar forming the loading support 50 has an inner duct 61 connected to a pressurized air supply source (not shown) and a lateral opening in communication with said inner duct 61 forming an air blowing nozzle 55 the function of which is explained below.

As are better shown in FIGS. 4 to 8, the jaws of each of the spreading clamps 4a comprise a spreading support 56 fixed with respect to the corresponding carriage 6a (FIG. 1), a movable spreading jaw 57 driven by a second actuator 58 for pressing the spreading jaw 57 against said spreading support 56, and a release stop 59 located in the path of the auxiliary loading jaw 53 when the loading clamp 24a moves from its loading position to its transferring position. In the embodiment shown, this release stop 59 is fixed to the spreading jaw 57 and moves therewith, although alternatively it could be arranged in a fixed position.

In relation with FIGS. 4 to 8, the operation of the loading clamps 24a, 24b in cooperation with the spreading clamps 4a, 4b to transfer the corners C1, C2 of the flat clothing article A from one to another is described.

Figure 4:
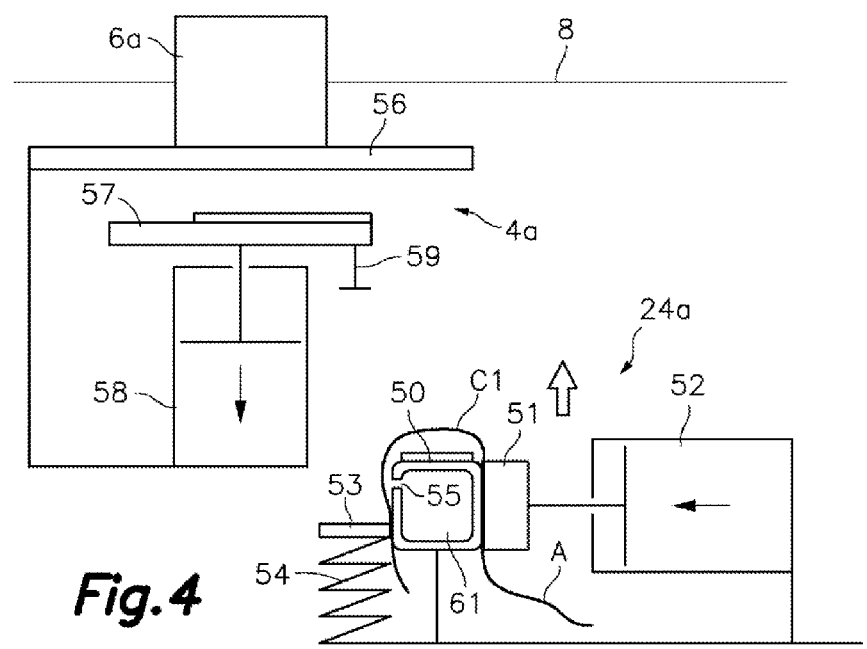
FIGS. 4 to 8 are schematic plan views showing a sequence of actions during the transfer of a flat clothing article from a loading clamp to a spreading clamp.

As shown in FIG. 4, once the corner C1 of the flat clothing article A is secured in the loading clamp 24a, with the proximal portion of the corner C1 caught by the loading jaw 51 against one side of the loading support 50 and the distal portion of the corner C1 caught by the auxiliary loading jaw 53 against an opposite second side of the loading support 50, the loading clamp moves towards the corresponding spreading clamp 4a, the spreading jaw 57 thereof is in an open position with respect to the spreading support 56.

Figure 5:
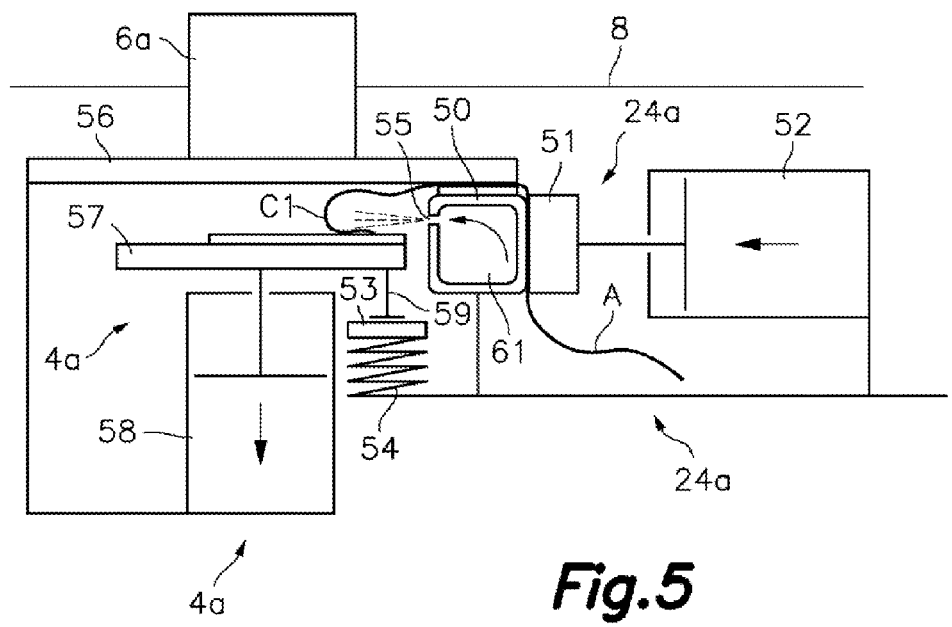

The FIG. 5 shows how, by virtue of the specific positioning of the release stop 59 of the spreading clamp 4a when its spreading jaw 57 is in the open position, the release stop 59 stops the auxiliary loading jaw 53 of the loading clamp 24a. An elastic deformation of the elastic element 54 allows keeping the auxiliary loading jaw 53 stopped by the release stop 50 while the loading clamp 24a continues moving forward until reaching its end of travel, which is reached in the embodiment illustrated when the loading support 50 of the loading clamp 24a abuts the spreading support 56 of the spreading clamp 4a.

In this position, the elastic deformation of the elastic element 54 makes the auxiliary loading jaw 53 open and the distal portion of the corner C1 of the flat clothing article A is released while the proximal portion of the corner C1 continues to be caught between the loading support 50 and the loading jaw 51 of the loading clamp 24a and additionally between the loading support 50 of the loading clamp 24a and the spreading support 56 of the spreading clamp 4a. Then, an airflow blown from said air blowing nozzle 55 against the flat clothing article A between said loading jaw 51 and said auxiliary loading jaw 53 pushes the distal portion of the corner C1 such that this distal portion is introduced between the spreading support 56 and the spreading jaw 57 of the spreading clamp 4a.

Figure 6:
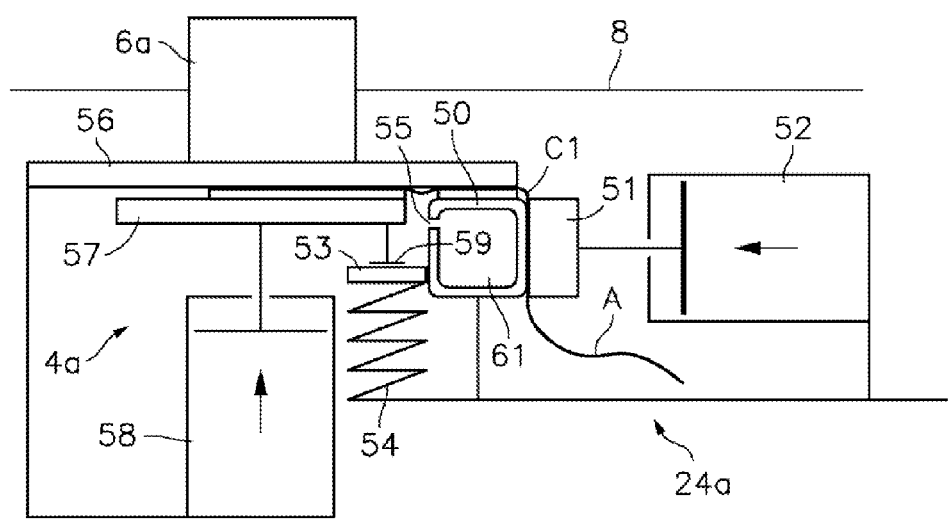

Next, as shown in FIG. 6, the second actuator 58 is activated for moving the spreading jaw 57 of the spreading clamp 4a to its closed position, whereby the distal portion of the corner C1 of the flat clothing article A is caught between the spreading support 56 and the spreading jaw 57 of the spreading clamp 4a.

Figure 7:
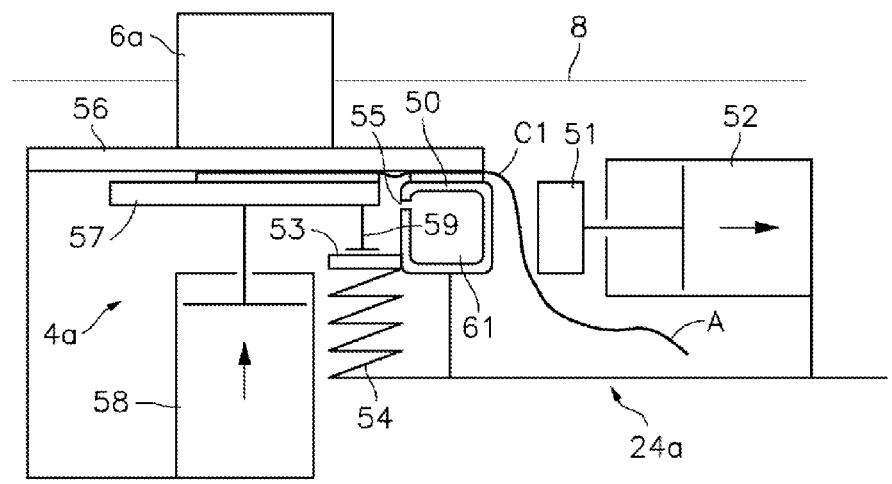

From this position, as shown in FIG. 7, the first actuator 52 is activated for moving the loading jaw 51 of the loading clamp 24a to its open position, whereby the proximal portion of the corner C1 of the flat clothing article A is released from the loading clamp 24a while the distal portion continues to be caught by the spreading clamp 24a.

Figure 8:
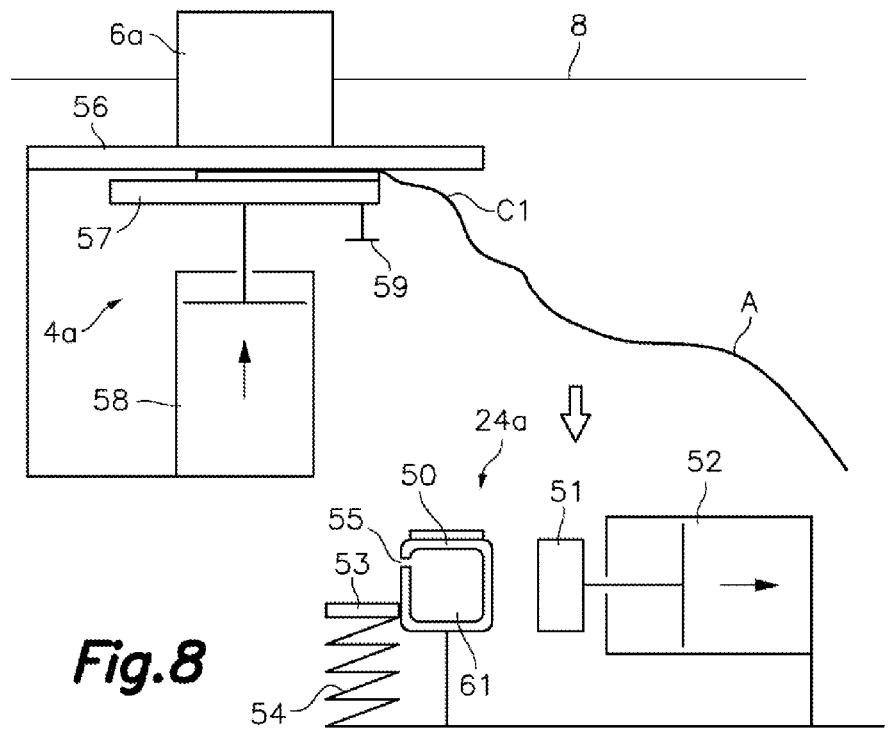

Finally, as shown in FIG. 8, once the proximal portion of the corner C1 of the flat clothing article A has been released from the loading clamp 24a, the latter is again moved by its driving means to the loading position while the corner C1 of the flat clothing article A remains transferred to the spreading clamp 4a in such conditions which assure subsequent deposition on the conveyor belt 30 without folds or wrinkles.

Figure 9:
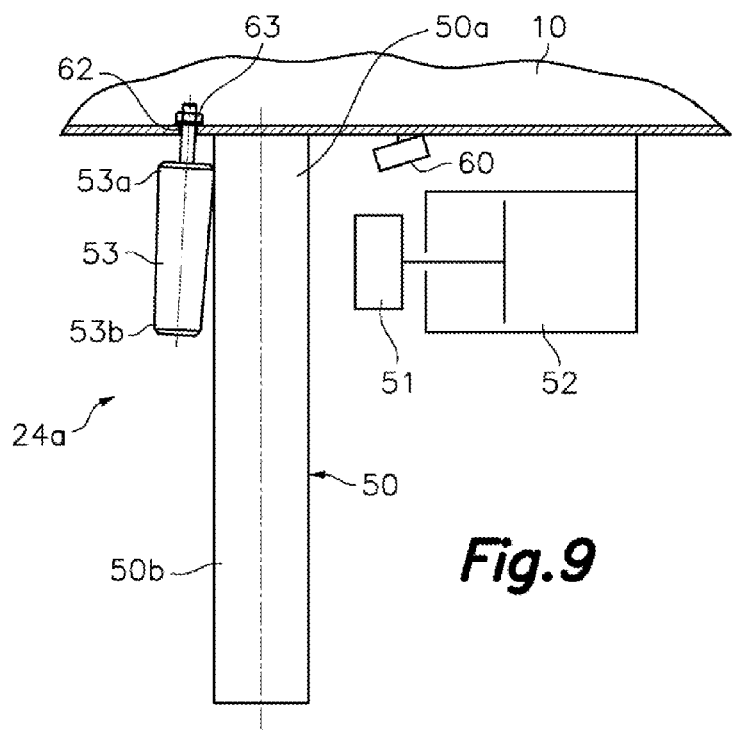
FIG. 9 is a schematic front view of a loading clamp according to an alternative embodiment.
Figure 10:
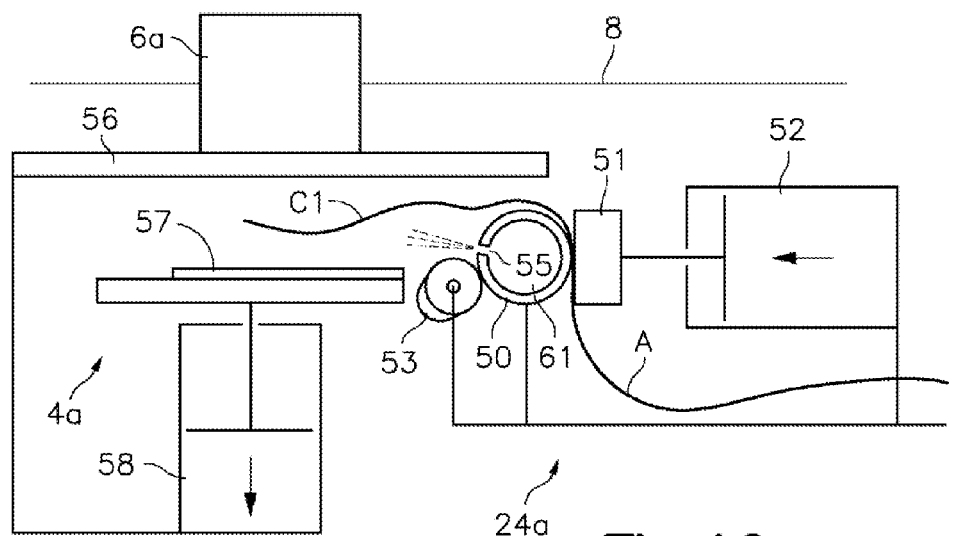
FIGS. 10 to 12 are schematic plan views showing the action of transferring a flat clothing article from the loading clamp of FIG. 9 to several spreading clamps according to different embodiments.
Figure 11:
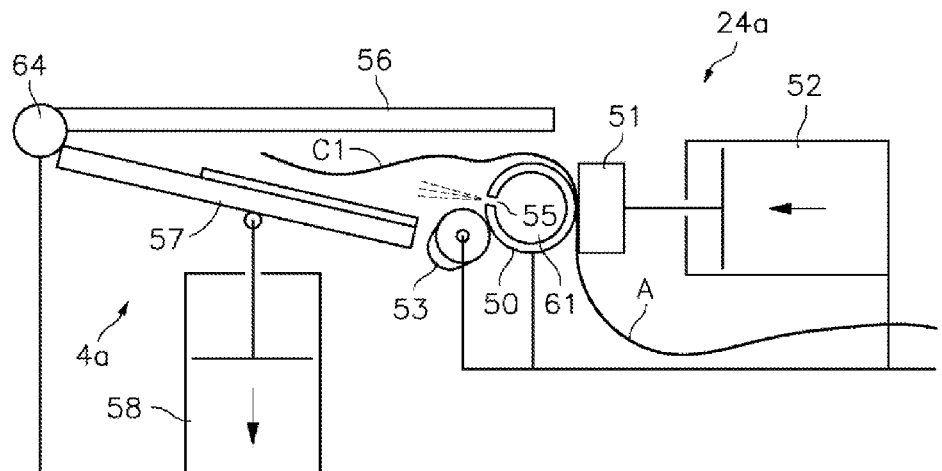
Figure 12:
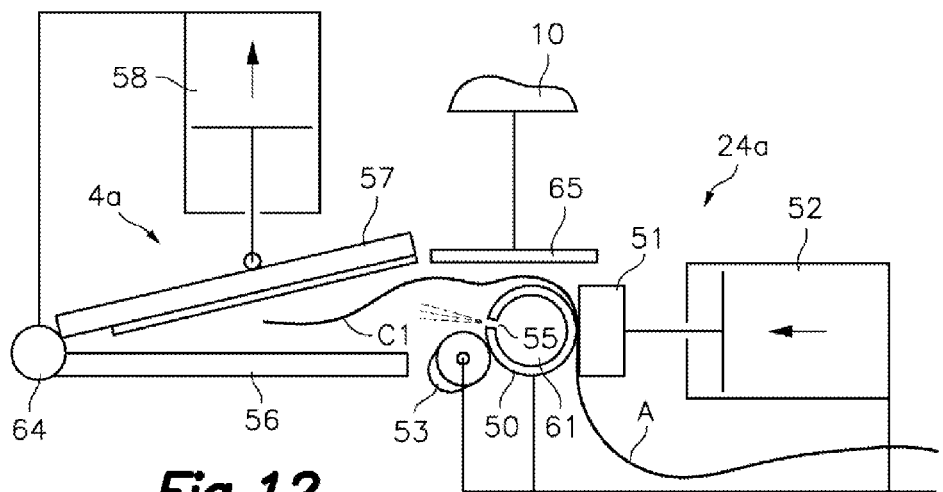

FIG. 9 shows one of the loading clamps 24a according to an alternative embodiment which, similarly to that described above in relation with FIG. 3, comprises a loading support 50 in the form of a substantially vertical bar having an upper end fixed to the frame 10 of the machine and a free lower end. A loading jaw 51 and an auxiliary loading jaw 53 are adjacent to the upper portion 50a of the loading support 50. The loading jaw 51 is driven by a first actuator 52 to catch and maintain a proximal portion of one of the corners C1 of the flat clothing article A against one side of said loading support 50, whereas the auxiliary loading jaw 53 is configured and arranged such that it has yielding and recovery capacity. The loading support 50 includes an inner duct 61 and a blowing nozzle 55 (FIGS. 10 to 12). An article detector 60, such as a photoelectric cell is arranged for detecting the presence of the flat clothing article A in the upper portion 50a of the loading support 50.

The difference of this embodiment shown in FIG. 9 lies in the operation of the auxiliary loading jaw 53 which is suspended from the frame 10 such that it can freely swing and is pushed by gravity to press against said opposite second side of the loading support 50 and thereby catch and maintain the distal portion of the corresponding corner C1 of the flat clothing article A against the opposite second side of the loading support 50. Another difference is that the loading support 50 has an externally cylindrical shape (FIGS. 10 to 12).

In the embodiment shown in FIG. 9, the auxiliary loading jaw 53 is conical-shaped with a relatively low degree of tapering and is arranged with a broadest end 53a on the upper side and a narrowest end 53b on the lower side. A rod inserted loosely through a hole 62 of the frame 10 extends upwards from said broadest end 53a and a stop 63 fixed to the rod keeps the auxiliary loading jaw 53 hanging from the frame 10 with a certain play. The distance between the shaft of the auxiliary loading jaw 53 at the point of connection with the frame 10 and the outer cylindrical surface of the loading support 50 is slightly less than the radius of the broadest part 53a of the auxiliary loading jaw 53, such that when the auxiliary loading jaw 53 hangs freely by gravity this broadest end 53a contacts the loading support 50 and the narrowest end 53b is sufficiently separated from the loading support 50 to facilitate the manual introduction of the flat clothing article A between the auxiliary loading jaw 53 and the loading support 50.

The auxiliary loading jaw 53 has a mass selected on purpose so that the pressure exerted by the auxiliary loading jaw 53 against the loading support 50 is sufficient to catch and retain the distal portion of the corner C1, C2 of the flat clothing article A when the blowing nozzle 55 is inactive. Nevertheless, when the blowing nozzle 55 is activated (FIGS. 10 to 12), the airflow produced by the same is strong enough for making the auxiliary loading jaw 53 yield and thereby releasing the distal portion of the corner C1, C2 of the flat clothing article A.

FIG. 10 shows the loading clamp 24a of FIG. 9 interacting with a spreading clamp 4a similar to that described above in relation with FIGS. 4 to 8 which comprises a spreading support 56 fixed with respect to the corresponding carriage 6a (FIG. 1), and a movable spreading jaw 57 driven by a second actuator 58 for moving between open and closed positions. When the loading clamp 24a is in the transferring position (FIG. 10) and the spreading jaw 57 is in an open position, the airflow produced by the blowing nozzle 55 releases the distal portion of the corner C1 of the flat clothing article A and introduces it between the spreading support 56 and the spreading jaw 57 of the spreading clamp 4a. Then the spreading jaw 57 is moved to the closed position, the loading jaw 51 of the loading clamp 24a is moved to the open position and the loading clamp 24a is moved again to the loading position (not shown).

FIG. 11 shows the loading clamp 24a of FIG. 9 interacting with a spreading clamp 4a according to another alternative embodiment which comprises a fixed spreading support 56 and a movable spreading jaw 57 driven by a second actuator 58 for moving between open and closed positions. The only difference with respect to the spreading clamp 4a described in relation with FIG. 10 is that the spreading jaw 57 is provided with a pivoting movement about a pivot shaft 64 instead of a linear movement.

FIG. 12 shows the loading clamp 24a of FIG. 9 interacting with a spreading clamp 4a according to yet another alternative embodiment which comprises a fixed spreading support 56 and a moveable spreading jaw 57 driven by a second actuator 58 for moving between open and closed positions, where the spreading jaw 57 is provided with a pivoting movement about a pivot shaft 64. The only difference with respect to the spreading clamp 4a described in relation with FIG. 11 is that the spreading support 56 and the spreading jaw 57 are in reverse positions, i.e., the fixed spreading support 56 is located on the side facing the loading station and the movable spreading jaw 57 is located on the inner side of the machine.

FIG. 12 further shows a small screen 65 fixed to the frame 10 and arranged to prevent the distal portion of the corner C1 of the flat clothing article A from leaving the space between the spreading support 56 and the spreading jaw 57 of the spreading clamp 4a in the open position once released and propelled by the airflow produced by the blowing nozzle 55.

Referring now to FIGS. 13 to 19, there is shown a machine for spreading out and loading flat clothing articles according to a second embodiment of the present invention, which comprises a frame 10 supporting a conveyor belt 30 having a considerably horizontal or slightly inclined upper section moving in a loading direction D. The conveyor belt 30 has a loading end 30a on which there is deposited a duly spread out and positioned upper part of flat clothing articles A1, A2, and an unloading end 30b, from which the spread out flat clothing articles A1, A2 are transferred to a laundry processing unit 33, such as an ironing unit or a folding unit, schematically depicted by means of dashed lines. Flat clothing articles are understood as linen elements and other clothing for use in the home, hospitals, hotels, restaurants, etc., such as tablecloths, napkins, sheets, pillowcases, and cloths, among others.

The mentioned loading end 30a of the conveyor belt 30 is covered frontally by a protective cover 11, and the machine of this second embodiment includes first and second loading stations 1, 2 adjacent to first and second side ends of said protective cover 11, beyond corresponding first and second side ends 30c, 30d of the conveyor belt 30. The first and second loading stations 1, 2 are used by respective first and second operators P1, P2 in a semiautomatic loading mode.

Along the width of the conveyor belt 30 and of the first and second loading stations 1, 2 there is extended a guide rail 8 arranged in a direction transverse to said loading direction D of the conveyor belt 30. A pair of first spreading clamps 4a, 4b are installed on corresponding first carriages 6a, 6b which are independently moved by driving means along said guide rail 8 between a receiving position, in which said first spreading clamps 4a, 4b are adjacent to one another in said first loading station 1 (FIG. 13), and a spread out position, in which the first spreading clamps 4a, 4b are separated from one another and positioned facing the loading end of the conveyor belt 30 (FIG. 14).

Similarly, a pair of second spreading clamps 5a, 5b are installed on corresponding second carriages 7a, 7b which are moved independently by driving means along the guide rail 8 between a receiving position, in which said second spreading clamps 5a, 5b are adjacent to one another in said second loading station 2 (FIG. 14), and a spread out position, in which the second spreading clamps 5a, 5b are separated from one another and positioned facing the loading end of the conveyor belt 30 (FIG. 13).

When the pair of first spreading clamps 4a, 4b is in its receiving position in the first loading station 1 (FIG. 13), the first operator P1 searches for contiguous corners of a first flat clothing article A1 and catches them manually to the first pair of spreading clamps 4a, 4b. Once the corners are caught, a swift movement of the first spreading clamps 4a, 4b towards their spread out position (FIG. 14) spreads the first flat clothing article A1 until its upper edge is taut and positions it facing the conveyor belt 30. At the same time that first spreading clamps 4a, 4b position the first flat clothing article A1 in the spread out position, the pair of second spreading clamps 5a, 5b is in its receiving position in the second loading station 2 (FIG. 14), and the second operator P2 searches for contiguous corners of a second flat clothing article A2 so as to catch them manually to the second pair of spreading clamps 5a, 5b. Next, a swift movement of the second spreading clamps 5a, 5b towards their spread out position (FIG. 13) spreads the second flat clothing article A2 until its upper edge is taut and positions it facing the conveyor belt 30, while the pair of first spreading clamps 4a, 4b have swiftly returned to their receiving position in the first loading station 1 (FIG. 13), and the loading cycle will thus be repeated.

In the spread out position, the first and second spreading clamps 4a, 4b; 5a, 5b hold the corresponding first or second flat clothing article A1, A2 hanging by gravity inside a narrow pit (not shown) adjacent to the loading end 30a of the conveyor belt 30. From this spread out position, an upper part of the first and second flat clothing articles A1, A2 is deposited on the loading end 30a of the conveyor belt 30 by deposition means which will be explained in detail below, and the first and second flat clothing articles A1, A2 are transported in the loading direction D by the conveyor belt 30 and transferred to the laundry processing unit 33.

The first and second loading stations 1, 2 define respective enclosures in which there are positioned the pairs of first and second spreading clamps 4a, 4b; 5a, 5b when they are in their receiving positions, and said enclosures have respective windows through which the first and second operators P1, P2 access the enclosures. The first and second loading stations 1, 2 comprise respective first and second access protection screens 13, 14 located in said windows and are moved vertically by driving means between an open position (indicated by means of dashed lines in FIGS. 13 and 14) and a closed position (indicated by means of solid lines in FIGS. 13 and 14). The first and second loading stations 1, 2 also comprise respective first and second inner protection screens 15, 16 moved vertically by driving means between an open position (indicated by means of dashed lines in FIGS. 13 and 14) and a closed position (indicated by means of solid lines in FIGS. 13 and 14).

Thus, the first and second access protection screens 13, 14 are in positions approximately parallel to the protective cover 11 and substantially aligned therewith, whereas the first and second inner protection screens 15, 16 are in positions substantially perpendicular to the first and second access protection screens 13, 14. The driving means of the first and second access protection screens 13, 14 and of the first and second inner protection screens 15, 16 can be, for example, linear actuators 34 (FIG. 17) driven by fluid-dynamic or electric energy.

In the open position, the first and second access protection screens 13, 14 allow the access of the first or second operator P1, P2 to the corresponding enclosure of the first or second loading station 1, 2 where the pair of first or second spreading clamps 4a, 4b; 5a, 5b is located when the same is in the receiving position, and in the closed position, the first and second access protection screens 13, 14 close the mentioned windows and prevent the access of the first or second operator P1, P2 to the corresponding pair of first or second spreading clamps 4a, 4b; 5a, 5b.

When the first and second inner protection screens 15, 16 are in the open position, they allow the movements of the corresponding pair of first or second spreading clamps 4a, 4b; 5a, 5b between their receiving positions inside the corresponding enclosure of the first or second loading station 1, 2 and their spread out positions facing the loading end 30a of the conveyor belt 30. When the first and second inner protection screens 15, 16 are in the closed position, they prevent the access of the first or second operator P1, P2 to the corresponding pair of first or second spreading clamps 4a, 4b; 5a, 5b when the same are not in the first or second loading station 1, 2, i.e., when they are in their spread out positions or being moved at high speed towards or from their spread out positions facing the loading end 30a of the conveyor belt 30.

The machine comprises control means which control the driving means moving the first and second access protection screens 13, 14 and the first and second inner protection screens 15, 16 such that when the first access protection screen 13 is in its open position (FIG. 13), then the first inner protection screen 15 is in its closed position, the second access protection screen 14 is in its closed position, and the second inner protection screen 16 is in its open position, and when the first access protection screen 13 is in its closed position (FIG. 14), then the first inner protection screen 15 is in its open position, the second access protection screen 14 is in its open position, and the second inner protection screen 16 is in its closed position.

This alternating movement of the protection screens provides a very high level of safety for the first and second operators P1, P2 against the risk of being harmed by the first and second spreading clamps 4a, 4b; 5a, 5b being moved at high speed. The opening of the access protection screens informs the first and second operators P1, P2 when a flat clothing article A1, A2 can be introduced and establishes the cycle rate.

Referring especially to FIGS. 15 and 16, the mentioned protective cover 11 frontally covering the loading end 30a of the conveyor belt 30 is movable and has a pressing edge 12 at a lower end facing the frame 10. The protective cover 11 is connected to a casing portion 17 by means of a cover hinge 18, and driving means 20, such as fluid-dynamic cylinders or the like, are operatively connected to the protective cover 11 and to the casing portion 17 to drive pivoting movements of the protective cover 11 about the cover hinge 18 between a free passage position (FIG. 15), in which said pressing edge 12 is at a distance from the frame 10 sufficient to allow the passage of the first and second flat clothing articles A1, A2 when they are held and moved by the pair of first or second spreading clamps 4a, 4b; 5a, 5b between their receiving and spread out positions and insufficient to allow the access of the hands of the operator to dangerous areas of the machine where the spreading clamps 4a, 4b; 5a, 5b move at high speed, and a retaining position (FIG. 16), in which the pressing edge 12 is applied against the frame 10 catching therebetween the first or second flat clothing article A1, A2 while the same is spread out and held by the first or second spreading clamps 4a, 4b; 5a, 5b in their spread out position.

When the protective cover 11 is in said free passage position (FIG. 15) the aforementioned distance between the pressing edge 12 of the protective cover 11 and the frame 10 is in the range of 12 to 120 mm. However, this distance depends on the vertical distance from the pressing edge 12 of the protective cover 11 to said dangerous areas of the machine, i.e. the path along which the first and second spreading clamps 4a, 4b; 5a, 5b move, so that the shorter said vertical distance the shorter the aforementioned distance between the pressing edge 12 of the protective cover 11 and the frame 10 in the free passage position. In a limit case where this vertical distance is very short, the distance between the pressing edge 12 of the protective cover 11 in the free passage position and the frame 10 can be reduced to the range of 12 to 40 mm.

Once the protective cover 11 has reached its retaining position (FIG. 16), the pair of first or second spreading clamps 4a, 4b; 5a, 5b releases the contiguous corners of the first or second flat clothing article A1, A2, such that the latter is caught and supported by the pressing edge 12 against the frame 10. Then the mentioned deposition means act, which in the illustrated example comprise an blowing nozzle 21 fixed to the protective cover 11 and arranged to blow an airflow on an upper part of the first or second flat clothing article A1, A2 comprised between the pressing edge 12 and the pair of first or second spreading clamps 4a, 4b; 5a, 5b. When the airflow contacts the first or second flat clothing article A1, A2 it deposits the upper part thereof on the loading end 30a of the conveyor belt 30.

Above the conveyor belt 30, the deposition means further comprise a plurality of press wheels 22 installed at the ends of corresponding movable press arms 23 driven to press the upper part of the first or second flat clothing article A1, A2 against the loading end 30a of the conveyor belt 30. In the embodiment illustrated, the blowing nozzle 21 has the shape of a longitudinal slot formed in a hollow profile extending along the protective cover, although alternatively there could be a plurality of individual blowing nozzles. Likewise, the press wheels 22 could be replaced with a suction chamber (such as the suction chamber 32 shown in FIGS. 21-24) connected to a vacuum source and arranged below an upper section of the conveyor belt to attract by suction the first or second flat clothing article A1, A2 through openings existing in the conveyor belt.

The protective cover 11 is installed in a casing portion 17, which is in turn connected to the frame 10 by a casing hinge 19 about which said casing portion 17 together with the protective cover 11 can pivot with respect to the frame 10 between a semiautomatic loading position (FIGS. 15, 16 and 17) and a manual loading position (FIG. 18). In said semiautomatic loading position, the protective cover 11 frontally covers the loading end 30a of the conveyor belt 30 and its pressing edge 12 is in an operative condition, as has been described above. In said manual loading position, the casing portion 17 and the protective cover 11 are lifted upwards exposing the loading end 30a of the conveyor belt 30 to allow one or more operators to load small flat clothing articles Ap1, Ap2, Ap3 directly on the loading end 30a of the conveyor belt 30 in a manual loading mode.

Figure 19:
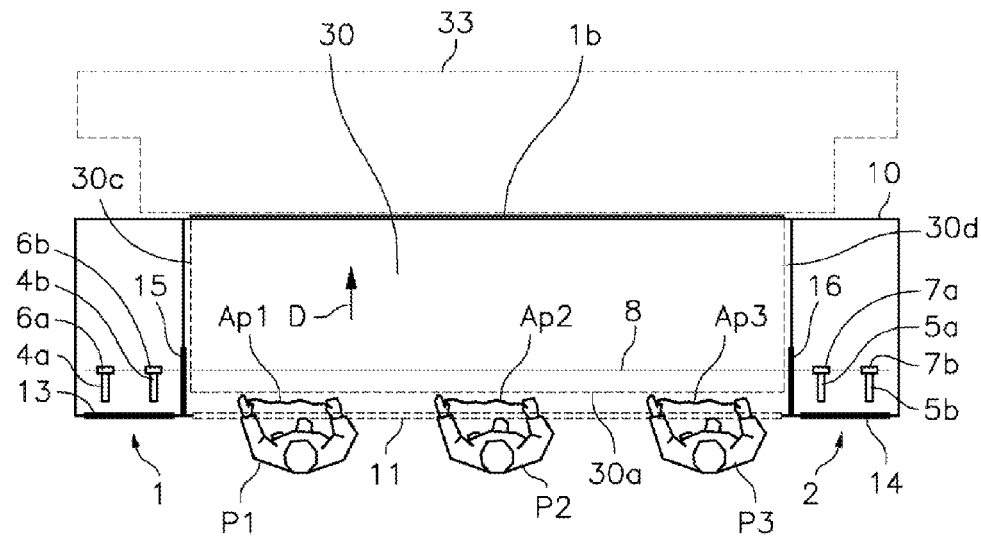
FIG. 19 is a plan view of the machine of FIG. 13 in the manual loading mode.

As shown in FIG. 19, in the manual loading mode, each operator deposits the small flat clothing articles Ap1, Ap2, Ap3 in a sector of the conveyor belt 30.

FIGS. 20 to 24 describe a machine for spreading out and loading flat clothing articles according to a third embodiment of the present invention, which comprises a third loading station 3 added to the basic configuration with two loading stations 1, 2 of the second embodiment.

Figure 20:
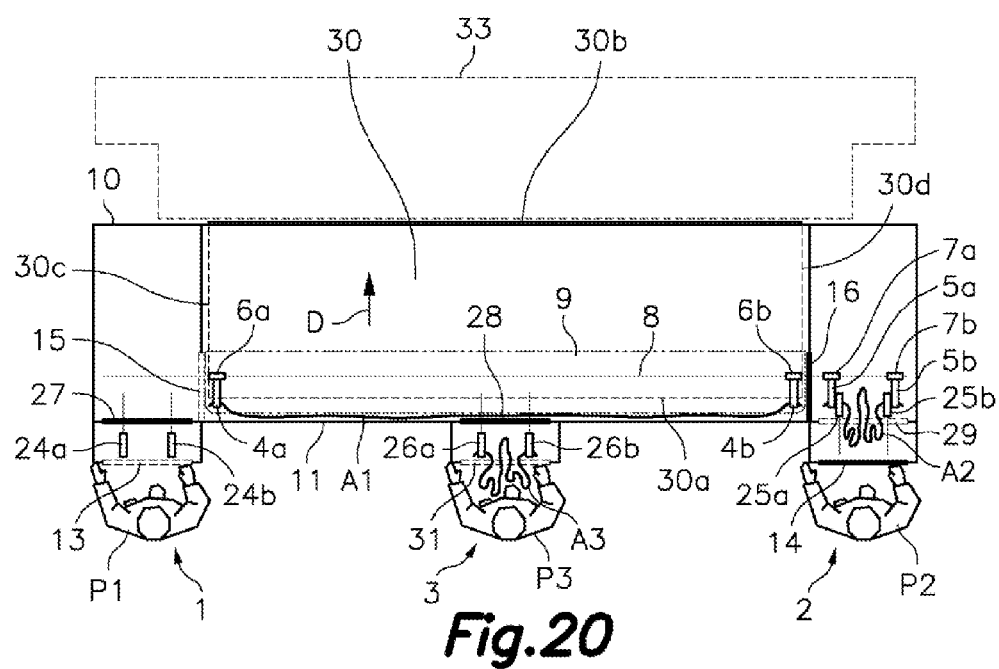
FIG. 20 is a schematic plan view of a machine for spreading out and loading flat clothing articles according to a third embodiment of the present invention with three loading stations in a semiautomatic loading mode.
Figure 21:
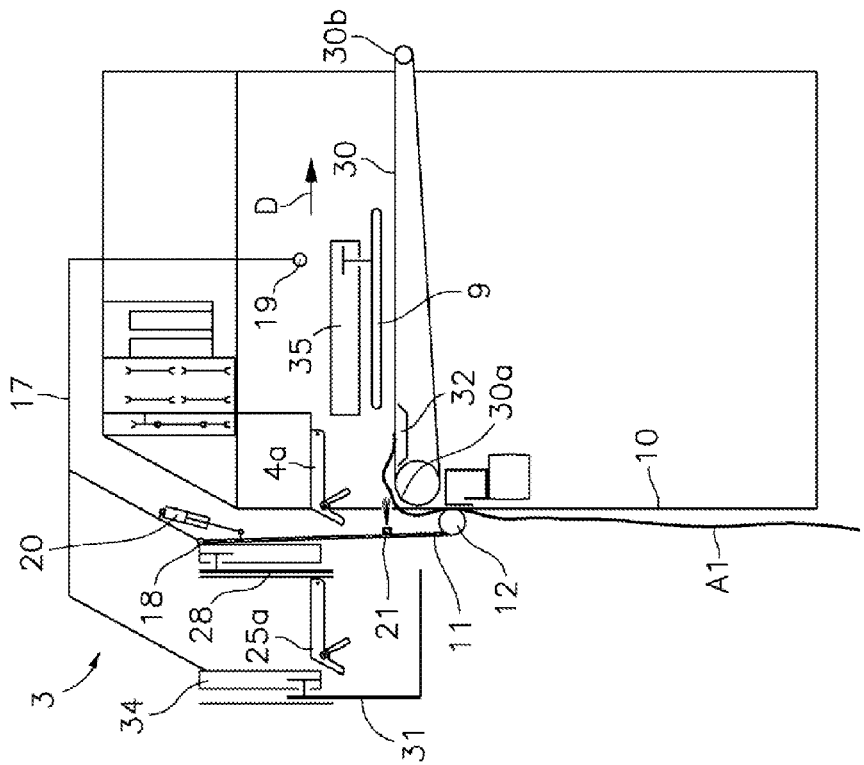
FIG. 21 is a side view of the machine of FIG. 20 in the semiautomatic loading mode with a protective cover in a free passage position.
Figure 22:
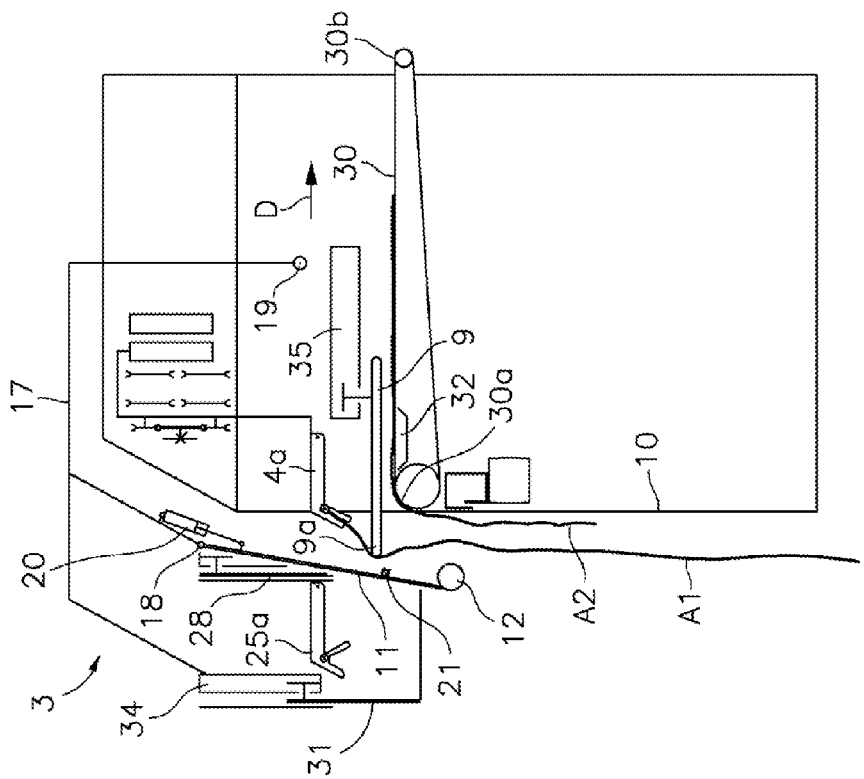
FIG. 22 is a side view of the machine of FIG. 20 in the semiautomatic loading mode with the protective cover in a retaining position.

As shown in FIG. 20, in this third embodiment, the mentioned third loading station 3 is located in a central area of the machine, between said first and second loading stations 1, 2 and facing the conveyor belt 30. The protective cover 11 has an opening (not shown) in register with the third loading station 3, and a third operator P3 is in charge of serving the third loading station 3 in the semiautomatic loading mode. The enclosures defined by the first, second and third loading stations 1, 2, 3 protrude outwards in relation with the protective cover 11, and have associated therewith respective pairs of first, second and third loading clamps 24a, 24b; 25a, 25b; 26a, 26b moved by driving means in a direction substantially perpendicular to the guide rail 8 between a loading position and a transferring position. The pairs of first and second spreading clamps 4a, 4b; 5a, 5b maintain the same configuration as in the second embodiment, and the pairs of first, second and third loading clamps 24a, 24b; 25a, 25b; 26a, 26b provide a significant increase of productivity and allow keeping the hands of the operators away from the first and second spreading clamps 4a, 4b; 5a, 5b, which move at high speed.

In said loading position, the pairs of first, second and third loading clamps 24a, 24b; 25a, 25b; 26a, 26b are adjacent to the windows of the enclosures defined by the first, second and third loading stations 1, 2, 3, such that they can receive contiguous corners of the first, second and third flat clothing articles A1, A2, A3 manually loaded by the corresponding first, second and third operators P1, P2, P3. In said transferring position, the pairs of first, second and third loading clamps 24a, 24b; 25a, 25b; 26a, 26b transfer the contiguous corners of the first, second and third flat clothing articles A1, A2, A3 to one of said pairs of first and second spreading clamps 4a, 4b; 5a, 5b.

The machine of this third embodiment comprises a separator element 9 in the shape of a plate located above the conveyor belt 30. This separator element is moved by driving means in coordination with the movements of the protective cover 11 between a separating position (FIG. 21) corresponding with the free passage position of the protective cover 11, and a retracted position (FIG. 22) corresponding with the retaining position of the protective cover 11. The mentioned driving means of the separator element 9 comprise, for example, a linear actuator 35 driven by fluid-dynamic or electric energy. The protective cover 11 maintains the same configuration as in the second embodiment, although in this third embodiment with three loading stations (FIG. 21), when the protective cover 11 is in its free passage position, it is further separated from the frame 10 in comparison with the second embodiment with two loading stations (FIG. 15).

In the mentioned separating position (FIG. 21), a separating edge 9a of said separator element 9 is at a distance from the protective cover 11, which is located in its free passage position. This distance is sufficient to allow the passage of the first, second and third flat clothing articles A1, A2, A3 (A1 in FIG. 21) held and moved by the first or second spreading clamps 4a, 4b; 5a, 5b between their receiving and spread out positions but insufficient to allow the access of the hands of an operator to dangerous areas of the machine where the spreading clamps 4a, 4b; 5a, 5b move at high speed. Furthermore, in this separating position, the separating edge 9a of the separator element 9 keeps the first, second or third flat clothing article A1, A2, A3 (A1 in FIG. 21) separated from the loading end 30a of the conveyor belt 30, which allows transporting a preceding flat clothing article A1, A2, A3 (A2 in FIG. 21) by the conveyor belt without hindering one another nor creating interferences.

When the separator 9 is in said separating position (FIG. 21) said distance between the separating edge (9a) of the separator element (9) and the protective cover (11) is in the range of 12 to 120 mm. However, this distance depends on the vertical distance from the separating edge (9a) of the separator element (9) to said dangerous areas of the machine, i.e. the path along which the first and second spreading clamps 4a, 4b; 5a, 5b move, so that the shorter said vertical distance the shorter the aforementioned distance between the separating edge (9a) of the separator element (9) and the protective cover (11) in the separating position. In a limit case where this vertical distance is very short, the distance between the separating edge (9a) of the separator element (9) in the separating position and the protective cover (11) can be reduced to the range of 12 to 40 mm.

The protective cover 11 allows a movement towards the operator P1, P2, P3 if the latter pulls the protective cover 11 outwards, in a direction opposite the frame 10, for example in the event that the operator P1, P2, P3 got his/her hands caught between the pressing edge 12 of the protective cover 11 and the frame 10, and control means are configured for stopping the operation of the machine in the event that one of the operators P1, P2, P3 pulls the protective cover 11 outwards. This feature is common for the embodiments with two and three loading stations.

In said retracted position (FIG. 22), the separator element 9 is retracted towards the inside of the machine and leaves the loading end 30a of the conveyor belt 30 free to allow depositing the first, second and third flat clothing articles A1, A2, A3. Thus, in this retracted position, the separator element 9 allows moving the protective cover 11 to its retaining position and the deposition means to deposit the upper part of the first, second or third flat clothing article A1, A2, A3 on the loading end 30a of the conveyor belt 30. The plate forming the separator element 9 is preferably round in shape to facilitate sliding the first, second and third flat clothing articles A1, A2, A3 thereon.

It must be pointed out that although this separator element 9 is essential for the third embodiment of the machine with three loading stations 1, 2, 3, it can also be applied to the second embodiment of the machine with two loading stations 1, 2, in which case it allows increasing the cycle speed without the risk of interference between the first and second flat clothing articles A1, A2.

Due to the presence of the separator element 9, in the third embodiment the deposition means comprise a suction chamber 32 (FIGS. 21 to 24) instead of the press wheels 22 described above in relation with the embodiment with two loading stations. The suction chamber 32 is arranged below an upper section of the conveyor belt 30 and connected to a vacuum source (not shown). The conveyor belt 30 has openings, for example formed by separations between parallel bands forming the conveyor belt 30, and the suction chamber 32 acts to attract by suction the first, second or third flat clothing article A1, A2, A3 against the loading end 30a of the conveyor belt 30 through said openings of the conveyor belt 30. The suction chamber is also applicable to the second embodiment with two loading stations when the same incorporates the separator element 9.

In the third embodiment with three loading stations 1, 2, 3, when the first and second access protection screens 13, 14 of the first and second loading stations 1, 2 are in the closed position, they prevent the access of the first and second operators P1, P2 to the respective pairs of first and second loading clamps 24a, 24b; 25a, 25b, and the third loading station 3 comprises a third access protection screen 31 moved by driving means between an open position, in which said third access protection screen 31 allows the access of the third operator P3 to the corresponding pair of third loading clamps 26a, 26b when the same is in the loading position, and a closed position, in which said third access protection screen 31 prevent the access of the third operator P3 to the corresponding pair of third loading clamps 26a, 26b.

Furthermore, the first, second and third loading stations 1, 2, 3 include respective first, second and third intermediate screens 27, 28, 29 moved by driving means between a closed position and an open position. In the closed position, said first, second and third intermediate screens 27, 28, 29 are interposed between the pairs of first, second and third loading clamps 24a, 24b; 25a, 25b; 26a, 26b and the pairs of first and second spreading clamps 4a, 4b; 5a, 5b when the latter are in the receiving position, which occurs when the corresponding first, second and third access protection screens 13, 14, 31 are in their open position. In the open position, the first, second and third intermediate screens 27, 28, 29 are lifted up and allow the movements of the pairs of first, second and third loading clamps 24a, 24b; 25a, 25b; 26a, 26b between there loading and transferring positions.

The driving means moving the third access protection screen 31 between its open and closed positions comprise for example a linear actuator 34 driven by fluid-dynamic or electric energy, and the driving means moving the first, second and third intermediate screens 27, 28, 29 between their open and closed positions comprise for example respective linear actuators 36 driven by fluid-dynamic or electric energy.

Figure 24:
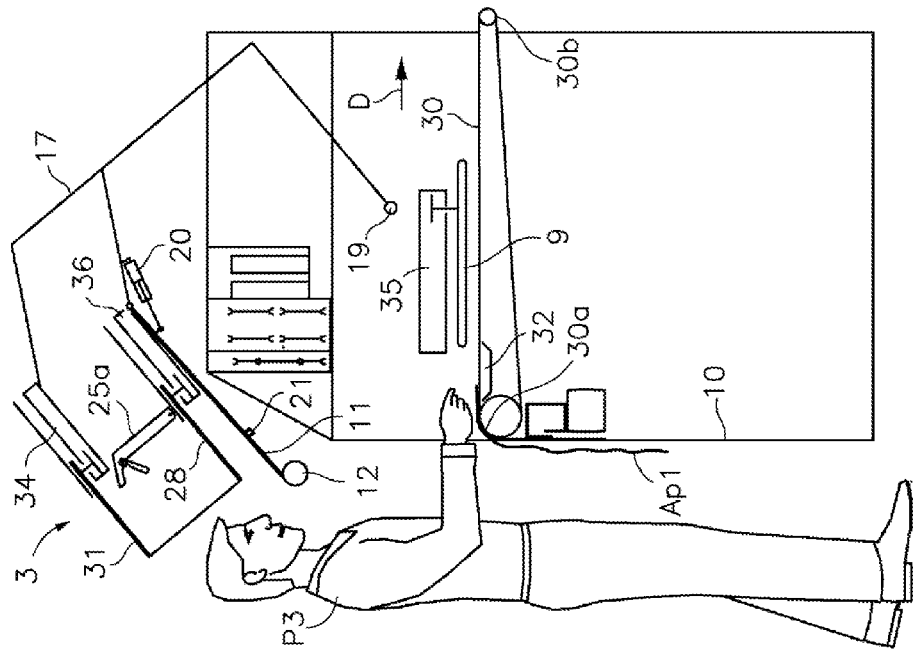
FIG. 24 is a side view of the machine of FIG. 20 in a manual loading mode.
Figure 23:
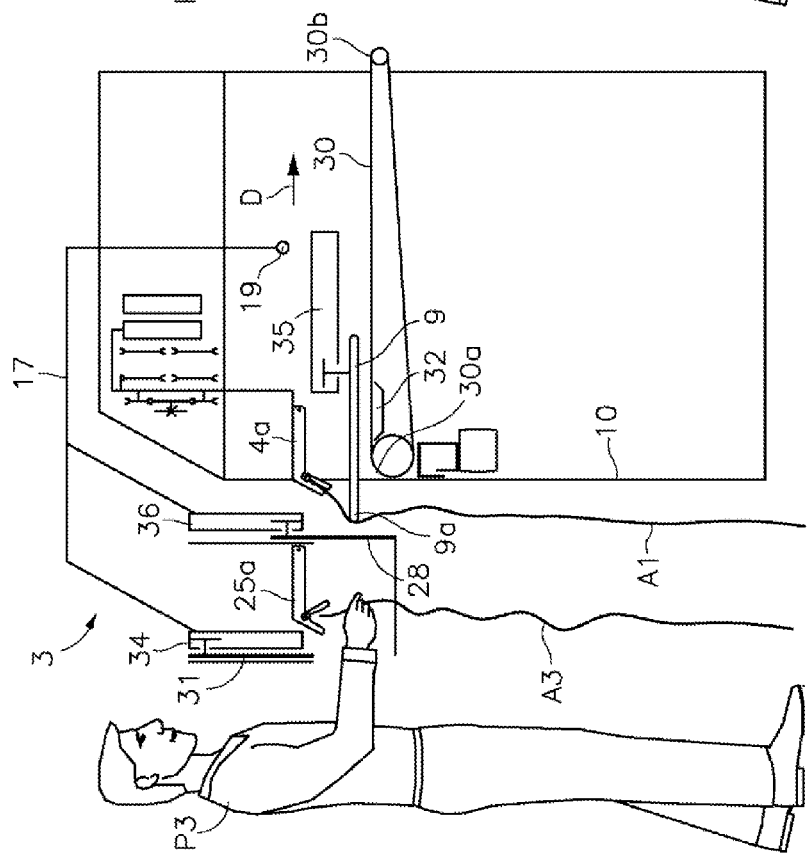
FIG. 23 is a side view of the machine of FIG. 20 showing a third loading station in the semiautomatic loading mode.

In this third embodiment with three loading stations 1, 2, 3, the protective cover 11 is installed in the casing portion 17 in a manner similar to that described above in relation with the second embodiment with two loading stations, and the third loading station 3 is fixed to the same casing portion 17. The casing portion 17 herein is also connected to the frame 10 by a casing hinge 19 about which said casing portion 17 together with the protective cover 11 and the third loading station 3 can pivot with respect to the frame 10 between a semiautomatic loading position (FIG. 23) and a manual loading position (FIG. 24).

In the semiautomatic loading position (FIG. 23), the protective cover 11 is in an operative condition frontally covering the loading end 30a of the conveyor belt 30 and the third loading station 3 is also in an operative condition. In the manual loading position (FIG. 24), the protective cover 11 and the third loading station 3 are lifted in an inoperative condition such that they expose the loading end 30a of the conveyor belt 30 to allow one or more operators P1, P2, P3 to load small flat clothing articles Ap1, Ap2, Ap3 directly on the loading end 30a of the conveyor belt 30 in a manner similar to that described above in relation with the second embodiment with two loading stations (FIG. 19).

Modifications, variations and combinations will readily occur to a person skilled in the art from the embodiments shown and described without departing from the scope of the present invention as defined in the attached claims.

The invention claimed is:

1. A machine for spreading out and loading flat clothing articles, comprising:
   a frame (10) supporting at least one conveyor belt (30) moving in a loading direction (D), and having a loading end (30a);
   a protective cover (11) frontally covering said loading end (30a) of the conveyor belt (30);
   first and second loading stations (1, 2) adjacent to first and second side ends of said protective cover (11);
   a pair of first spreading clamps (4a, 4b) moved independently by driving means along a guide rail (8) transverse to said loading direction (D) of the conveyor belt (30) between a receiving position, in which said first spreading clamps (4a, 4b) are adjacent to one another in said first loading station (1) for catching respective contiguous corners of a first flat clothing article (A1) manually loaded by a first operator (P1), and a spread out position, in which the first spreading clamps (4a, 4b) are separated from one another holding said first flat clothing article (A1) spread out with respect to said loading end (30a) of the conveyor belt (30);
   a pair of second spreading clamps (5a, 5b) moved independently by driving means along said guide rail (8) between a receiving position, in which said second spreading clamps (5a, 5b) are adjacent to one another in said second loading station (2) for catching respective contiguous corners of a second flat clothing article (A2) manually loaded by a second operator (P2), and a spread out position, in which the second spreading clamps (5a, 5b) are separated from one another holding said second flat clothing article (A2) spread out with respect to said loading end (30a) of the conveyor belt (30); and
   deposition means for depositing an upper end of said first and second flat clothing articles (A1, A2) on the conveyor belt (30) from said spread out position of the first and second spreading clamps (4a, 4b; 5a, 5b);
   wherein said protective cover (11) is movable and has a pressing edge (12) at a lower end, and driving means move the protective cover (11) between a free passage position, in which said pressing edge (12) is at a distance from the frame (10) sufficient to allow the passage of the first and second flat clothing articles (A1, A2) held and moved by the first or second spreading clamps (4a, 4b; 5a, 5b) between their receiving and spread out positions and insufficient to allow the access of the hands of the operator (P1, P2) to dangerous areas of the machine, and a retaining position, in which the pressing edge (12) is applied against the frame (10) catching therebetween the first or second flat clothing article (A1, A2) spread out and held by the first or second spreading clamps (4a, 4b; 5a, 5b) in their spread out position and supporting the first or second flat clothing article (A1, A2) while said deposition means act.

2. The machine for spreading out and loading flat clothing articles according to claim 1, wherein said distance from the frame (10) at which the pressing edge (12) of the protective cover (11) is in said free passage position is in the range of 12 to 120 mm.

3. The machine for spreading out and loading flat clothing articles according to claim 1, further comprising a separator element (9) moved by driving means in coordination with the movements of the protective cover (11) between a separating position, in which a separating edge (9a) of said separator element (9) is at a distance from the protective cover (11) sufficient to allow the passage of the first and second flat clothing articles (A1, A2) held and moved by the first or second spreading clamps (4a, 4b; 5a, 5b) between their receiving and spread out positions and insufficient to allow the access of the hands of the operator (P1, P2) to said dangerous areas of the machine when the protective cover (11) is in the free passage position, and in which said separating edge (9a) keeps the first or second flat clothing article (A1, A2) separated from the loading end (30a) of the conveyor belt (30), and a retracted position, in which the separator element (9) leaves the loading end (30a) of the conveyor belt (30) free to allow depositing the first and second flat clothing articles (A1, A2) when the protective cover (11) is in the retaining position.

4. The machine for spreading out and loading flat clothing articles according to claim 3, wherein said distance from the protective cover (11) at which the separating edge (9a) of the separator element (9) is in said separating position is in the range of 12 to 120 mm.

5. The machine for spreading out and loading flat clothing articles according to claim 1, wherein the first and second loading stations (1, 2) comprise respective first and second access protection screens (13, 14) moved by driving means between an open position, in which said first and second access protection screens (13, 14) allow the access of said first or second operator (P1, P2) to the corresponding pair of first or second spreading clamps (4a, 4b; 5a, 5b) when the same is in the receiving position, and a closed position, in which said first and second access protection screens (13, 14) prevent the access to the corresponding pair of first or second spreading clamps (4a, 4b; 5a, 5b).

6. The machine for spreading out and loading flat clothing articles according to claim 5, wherein the first and second loading stations (1, 2) comprise respective first and second inner protection screens (15, 16) moved by driving means between an open position, in which said first and second inner protection screens (15, 16) allow the movements of the corresponding pair of first or second spreading clamps (4a, 4b; 5a, 5b) between their receiving and spread out positions, and a closed position, in which said first and second inner protection screens (15, 16) prevent the access of the first or second operator (P1, P2) to the corresponding pair of first or second spreading clamps (4a, 4b; 5a, 5b) when the same are not in the first or second loading station (1, 2).

7. The machine for spreading out and loading flat clothing articles according to claim 6, further comprising control means controlling said driving means of the first and second access protection screens (13, 14) and the first and second inner protection screens (15, 16) such that when the first access protection screen (13) is in its open position, then the first inner protection screen (15) is in its closed position, the second access protection screen (14) is in its closed position, and the second inner protection screen (16) is in its open position, and when the first access protection screen (13) is in its closed position, then the first inner protection screen (15) is in its open position, the second access protection screen (14) is in its open position, and the second inner protection screen (16) is in its closed position.

8. The machine for spreading out and loading flat clothing articles according to claim 1, wherein the protective cover (11) is movable outwards in a direction opposite the frame (10) from a semiautomatic loading position, and control means are provided configured for stopping the operation of the machine in the event that one of the first, second and third operators (P1, P2, P3) pulls the protective cover (11) outwards.

9. The machine for spreading out and loading flat clothing articles according to claim 5, further comprising a third loading station (3) configured to be served by a third operator (P3) located between said first and second loading stations (1, 2) facing said conveyor belt (30), wherein said first, second and third loading stations (1, 2, 3) include respective pairs of first, second and third loading clamps (24a, 24b; 25a, 25b; 26a, 26b) moved by driving means between a loading position, in which said pairs of first, second and third loading clamps (24a, 24b; 25a, 25b; 26a, 26b) can receive contiguous corners of the first, second and third flat clothing articles (A1, A2, A3) manually loaded by said first, second and third operators (P1, P2, P3), and a transferring position, in which the pairs of first, second and third loading clamps (24a, 24b; 25a, 25b; 26a, 26b) transfer said contiguous corners of the first, second and third flat clothing articles (A1, A2, A3) to one of said pairs of first and second spreading clamps (4a, 4b; 5a, 5b).

10. The machine for spreading out and loading flat clothing articles according to claim 9, wherein the first, second and third loading stations (1, 2, 3) include respective first, second and third intermediate screens (27, 28, 29) moved by driving means between a closed position, in which said first, second and third intermediate screens (27, 28, 29) are interposed between the pairs of first, second and third loading clamps (24a, 24b; 25a, 25b; 26a, 26b) and the pairs of first and second spreading clamps (4a, 4b; 5a, 5b) when the latter are in the receiving position and the corresponding first, second and third access protection screens (13, 14, 31) are in their open position, and an open position.

11. The machine for spreading out and loading flat clothing articles according to claim 10, wherein said first and second access protection screens (13, 14) of the first and second loading stations (1, 2) prevent the access of the first or second operator (P1, P2) to the respective first and second pairs of loading clamps (24a, 24b; 25a, 25b) when they are in the closed position, and said third loading station (3) comprises a third access protection screen (31) moved by driving means between an open position, in which said third access protection screen (31) allows the access of said third operator (P3) to the corresponding pair of third loading clamps (26a, 26b) when the same is in the loading position, and a closed position, in which said third access protection screen (31) prevent the access to the corresponding pair of third loading clamps (26a, 26b).

12. The machine for spreading out and loading flat clothing articles according to claim 1, wherein the protective cover (11) is installed in a casing portion (17) and said casing portion (17) is connected to the frame (10) by a casing hinge (19) about which said casing portion (17) together with the protective cover (11) can pivot with respect to the frame (10) between a semiautomatic loading position, in which the protective cover (11) frontally covers the loading end (30a) of the conveyor belt (30), and a manual loading position, in which the protective cover (11) exposes the loading end (30a) of the conveyor belt (30) to allow one or more operators to load small flat clothing articles (Ap1, Ap2, Ap3) directly on the loading end (30a) of the conveyor belt (30).

13. The machine for spreading out and loading flat clothing articles according to claim 12, wherein the protective cover (11) is connected to said casing portion (17) by a cover hinge (18) about which the protective cover (11) pivots between said free passage position and retaining position, and driving means (20) are operatively connected to the protective cover (11) and to the casing portion (17) to drive the movements the protective cover (11) between the free passage position and retaining position with respect to the casing portion (17) when the casing portion (17) is in the semiautomatic loading position.

14. The machine for spreading out and loading flat clothing articles according to claim 9, wherein the protective cover (11) and the third loading station (3) are installed in a casing portion (17) and said casing portion (17) is connected to the frame (10) by a casing hinge (19) about which said casing portion (17) together with the protective cover (11) and the third loading station can pivot with respect to the frame (10) between a semiautomatic loading position, in which the protective cover (11) frontally covers the loading end (30a) of the conveyor belt (30) and the third loading station (3) is in an operative condition, and a manual loading position, in which the protective cover (11) exposes the loading end (30a) of the conveyor belt (30) to allow one or more operators to load small flat clothing articles (Ap1, Ap2, Ap3) directly on the loading end (30a) of the conveyor belt (30) and the third loading station is in an inoperative condition.

15. The machine for spreading out and loading flat clothing articles according to claim 14, wherein the protective cover (11) is connected to said casing portion (17) by a cover hinge (18) about which the protective cover (11) pivots between said free passage position and retaining position, and driving means (20) are operatively connected to the protective cover (11) and to the casing portion (17) to drive the movements the protective cover (11) between the free passage position and retaining position with respect to the casing portion (17) when the casing portion (17) is in the semiautomatic loading position.

16. The machine for spreading out and loading flat clothing articles according to claim 1, wherein said deposition means comprise at least one blowing nozzle (21) fixed to the protective cover (11) and arranged for blowing an airflow on an upper part of the first or second flat clothing article (A1, A2) supported by the pressing edge (12) of the protective cover (11) when the pair of first or second spreading clamps (4a, 4b; 5a, 5b) have released said contiguous corners of the first or second flat clothing article (A1, A2) to deposit said upper part of the first or second flat clothing article (A1, A2) on the loading end (30a) of the conveyor belt (30).

17. The machine for spreading out and loading flat clothing articles according to claim 1, wherein the deposition means comprise a plurality of press wheels (22) installed at the ends of movable press arms (23) to press the upper part of the first or second flat clothing article (A1, A2) against the loading end (30a) of the conveyor belt (30).

18. A machine for spreading out and loading flat articles of clothing according to claim 1, wherein:
each of the loading stations (1), is provided with a pair of loading clamps (24a, 24b) driven for moving between a loading position, wherein said loading clamps (24a, 24b) are arranged to catch respective contiguous corners (C1, C2) of a flat article of clothing (A) manually loaded by an operator (P) in said loading station (1), and a delivery position, wherein the loading clamps (24a, 24b) transfer said corners (C1, C2) of said flat article of clothing (A) to said pair of spreading clamps (4a, 4b);
and wherein each of the loading clamps (24a, 24b) comprises:
a loading support (50);
a loading jaw (51) driven by a first actuator (52) to catch and maintain a proximal portion of one of the corners (C1, C2) of the flat article of clothing (A) against one side of said loading support (50);
an auxiliary loading jaw (53) suspended such that it can swing and is pushed by gravity against said opposite second side of the loading support (50) to catch and maintain a distal portion of the corner (C1, C2) of the flat article of clothing (A) against an opposite second side of said loading support (50); and
an air blowing nozzle (55) associated to the loading support (50) and arranged for blowing an airflow against the flat article of clothing (A) between said loading jaw (51) and said auxiliary loading jaw (53) said airflow releasing said distal portion of the corner (C1, C2) from said auxiliary loading jaw (53) and pushing and introducing the released distal portion of the corner (C1, C2) between a pair of jaws of the spreading clamp (4a, 4b) so that the distal portion of the corner (C1, C2) can be caught by the spreading clamp (4a, 4b) before the loading jaw (51) is opened.

19. The machine for spreading out and loading flat articles of clothing according to claim 18, wherein the loading support (50) is in the form of a substantially vertical bar having an upper end fixed to a frame (10) and a free lower end, and the loading jaw (51) and the auxiliary loading jaw (53) are adjacent to an upper portion (50a) of the loading support (50).

20. The machine for spreading out and loading flat articles of clothing according to claim 19, wherein the distal end of the corner (C1, C2) of the flat article of clothing (A) is caught by the effect of the weight of the auxiliary loading jaw (53) against the loading support (50) when the operator (P) arranges the corner (C1, C2) of the flat article of clothing (A) partially surrounding a lower portion (50b) of the loading support (50) and manually slides it to said upper portion (50a).

21. The machine for spreading out and loading flat articles of clothing according to claim 20, further comprising a control system including an article detector (60) provided for detecting the presence of the flat article of clothing (A) in the upper portion (50a) of the loading support (50) and controlling means for activating the first actuator (52) and thereby moving the loading jaw (51) to a closed position.

22. The machine for spreading out and loading flat articles of clothing according to claim 18, wherein the loading support (50) has an inner duct (61) connected to a pressurized air supply source and said air blowing nozzle (55) is in the form of a lateral opening formed in the loading support (50) in communication with said inner duct (61).

* * * * *